(12) United States Patent  (10) Patent No.: US 9,113,601 B2
Friton  (45) Date of Patent: Aug. 25, 2015

(54) STRUCTURE FOR GROWING PLANTS AND A METHOD OF CREATING THE STRUCTURE

(75) Inventor: Benjamin Franz Friton, Washington, DC (US)

(73) Assignee: Can PA Love, Cross Junction, VA (US)

( * ) Notice: Subject to any disclaimer, the term of this patent is extended or adjusted under 35 U.S.C. 154(b) by 320 days.

(21) Appl. No.: 13/584,817

(22) Filed: Aug. 13, 2012

(65) Prior Publication Data

US 2013/0042524 A1  Feb. 21, 2013

Related U.S. Application Data

(60) Provisional application No. 61/522,677, filed on Aug. 11, 2011.

(51) Int. Cl.
*A01G 9/02* (2006.01)
*A01G 25/00* (2006.01)

(52) U.S. Cl.
CPC ............... *A01G 9/023* (2013.01); *A01G 9/025* (2013.01); *Y10T 29/49826* (2015.01)

(58) Field of Classification Search
CPC ......... A01G 9/02; A01G 31/02; A01G 9/022; A01G 9/025; A01G 7/00; A01G 9/023; A01G 9/104; A01G 9/14
USPC ......... 47/17, 2, 65, 65.5, 65.7, 65.8, 66.7, 83, 47/79, 81, 82, 21.1
See application file for complete search history.

(56) References Cited

U.S. PATENT DOCUMENTS

| 2,113,523 | A | * | 4/1938 | White ............................. 47/33 |
| 2,121,173 | A | * | 6/1938 | MacPherson .................... 47/33 |
| 4,065,876 | A | * | 1/1978 | Moffett, Jr. ...................... 47/83 |
| 4,665,647 | A | * | 5/1987 | Behrens et al. ................ 510/235 |
| 4,961,284 | A | * | 10/1990 | Williams ....................... 47/66.5 |
| 5,031,359 | A | * | 7/1991 | Moffett, Jr. ...................... 47/83 |
| 5,423,148 | A | * | 6/1995 | Thornhill ...................... 47/29.1 |
| 5,647,695 | A | * | 7/1997 | Hilfiker et al. ................ 405/284 |
| 5,658,096 | A | * | 8/1997 | Von Kanel ................. 405/302.4 |
| 6,058,651 | A | * | 5/2000 | Perez ............................. 47/65.8 |
| 7,140,149 | B2 | * | 11/2006 | Searle et al. ................... 47/65.5 |
| 7,845,112 | B2 | * | 12/2010 | Felknor ......................... 47/65.8 |
| 8,578,651 | B1 | * | 11/2013 | Giacomantonio ............ 47/62 A |
| 8,777,514 | B2 | * | 7/2014 | Heselden ........................ 405/17 |
| 2007/0199241 | A1 | * | 8/2007 | Peleszezak ................... 47/65.9 |
| 2008/0313959 | A1 | * | 12/2008 | Singer ............................ 47/66.1 |

FOREIGN PATENT DOCUMENTS

GB  2055281 A * 6/1980 ............... A01G 9/02

* cited by examiner

*Primary Examiner* — Andrea Valenti

(57) ABSTRACT

A structure to grow plants including a fence, a fabric attached to the fence to form a fence-fabric combination shaped as a pillar with an enclosed area, and a growing material filled in the enclosed area, and a method for creating a structure to grow plants by providing a fencing material and a fabric, attaching the fabric to the fencing material to form a fence-fabric combination, shaping the fence-fabric combination into a pillar with an enclosed area, and filling the enclosed area with a growing material.

10 Claims, 52 Drawing Sheets

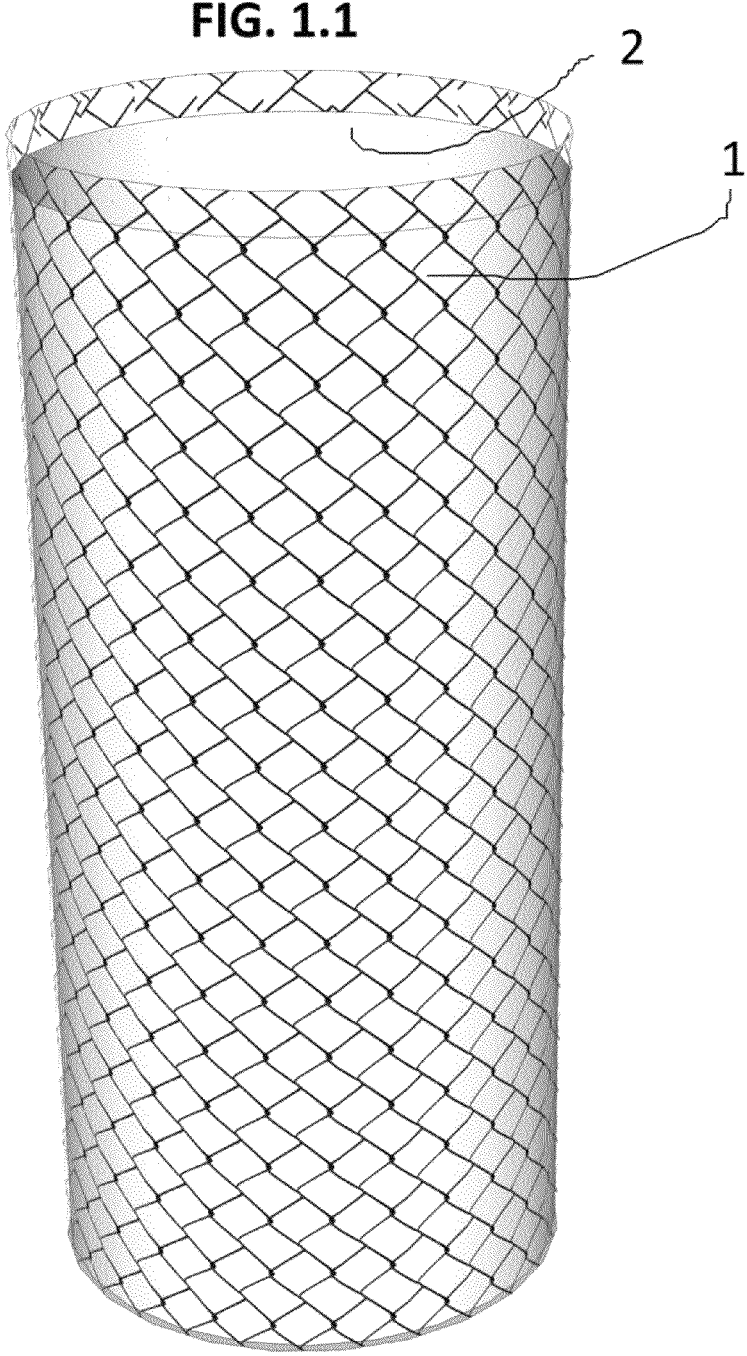
FIG. 1.1

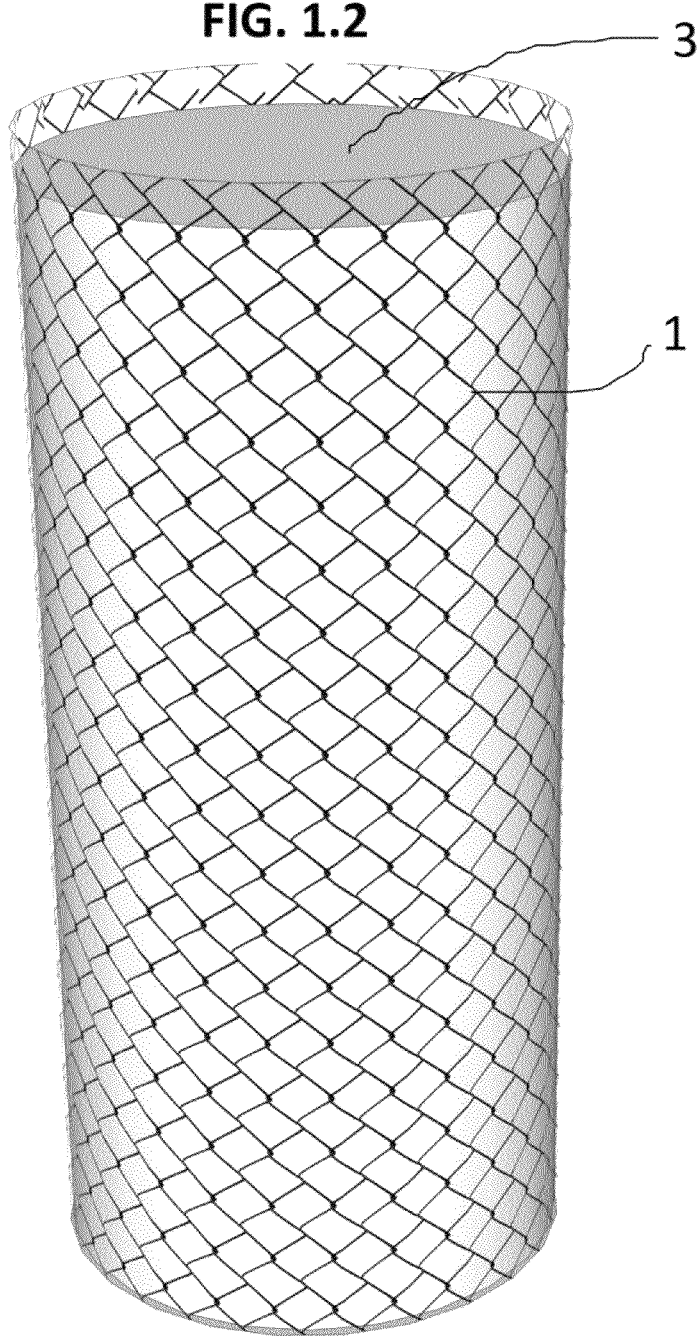

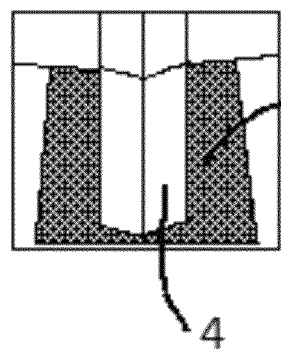
FIG. 4.1a
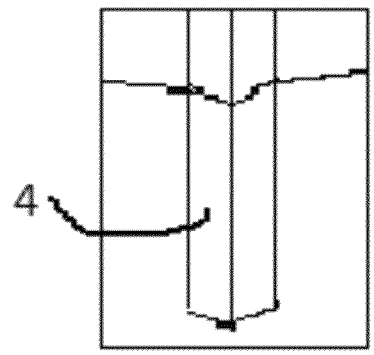
FIG. 4.1b

FIG. 4.2a
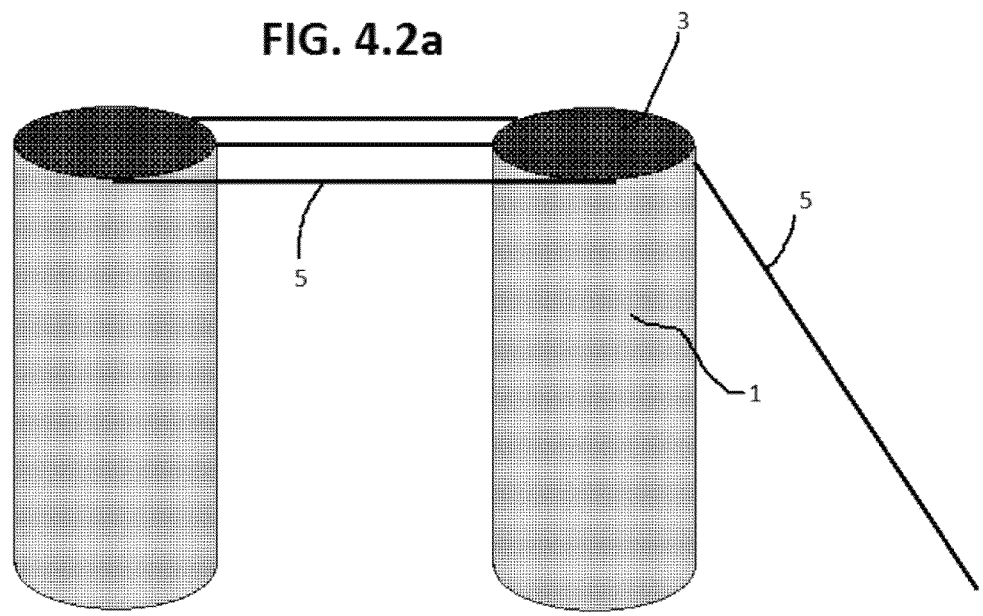
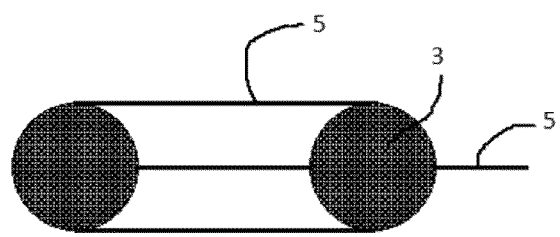
FIG. 4.2b
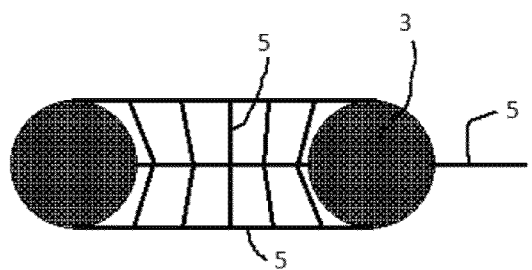
FIG. 4.2c

FIG. 5.1a
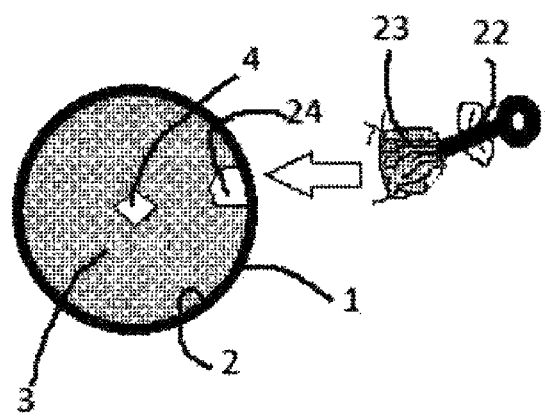
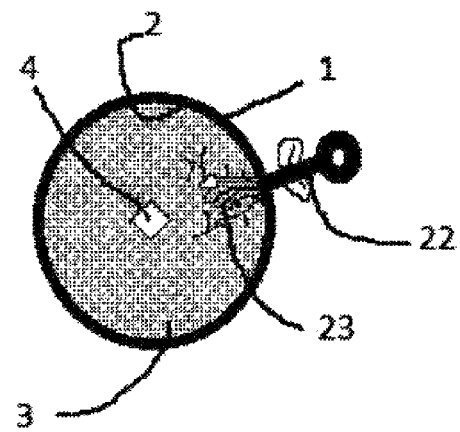
FIG. 5.1b

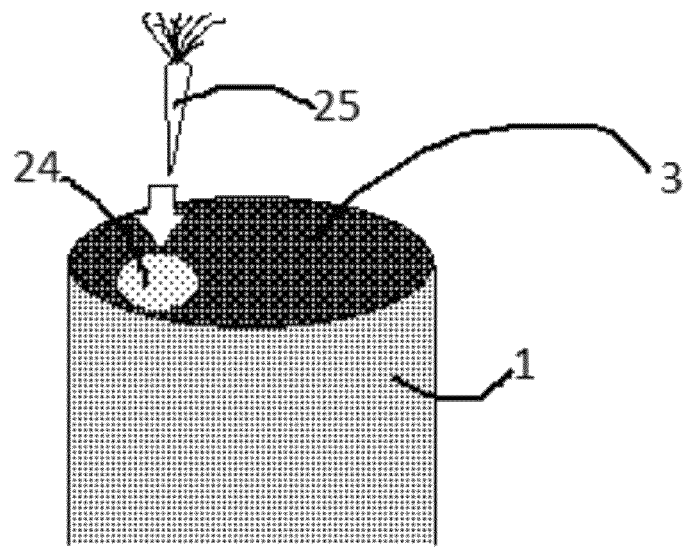
FIG. 5.2a
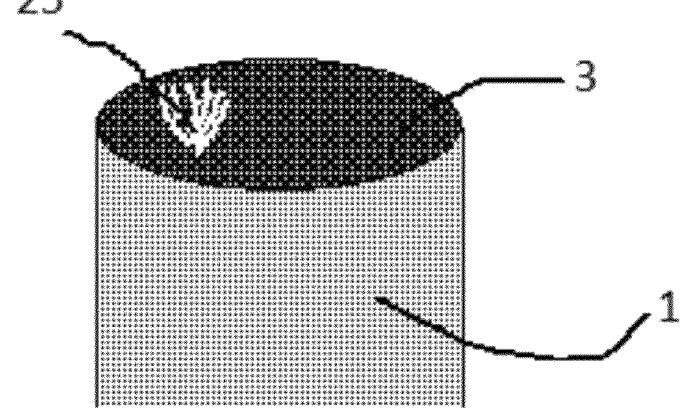
FIG. 5.2b

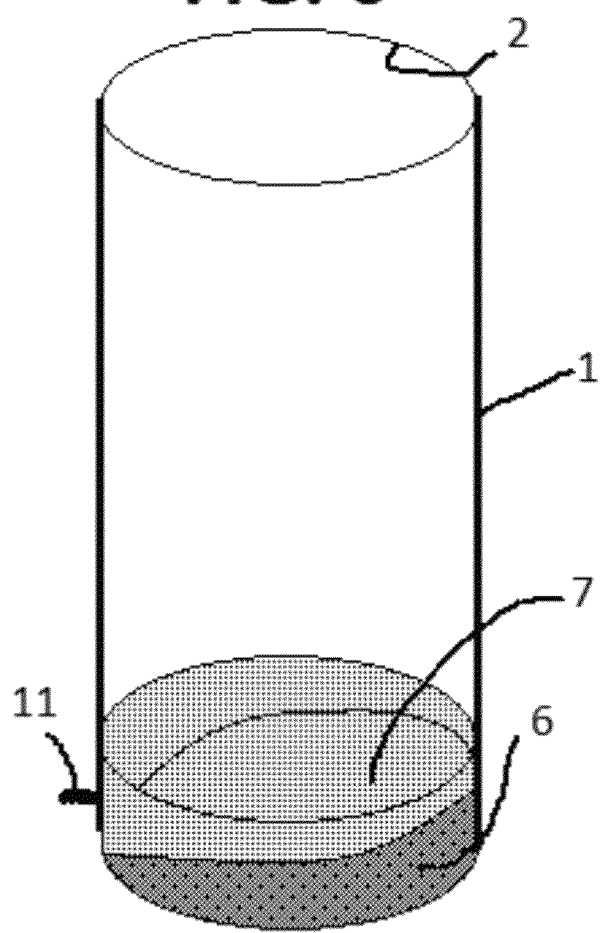

FIG. 6.1a
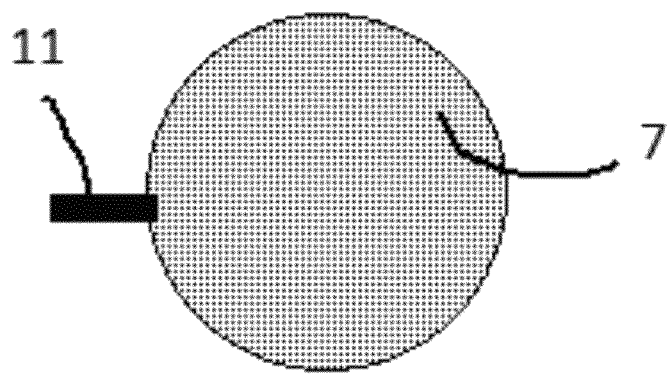
FIG. 6.1b
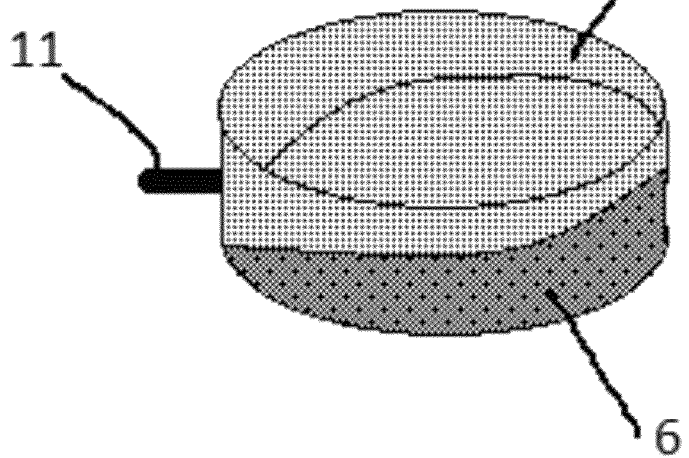

FIG. 6.2a
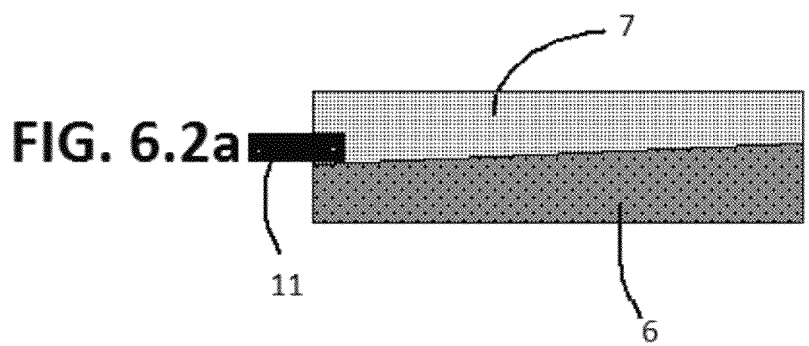
FIG. 6.2b
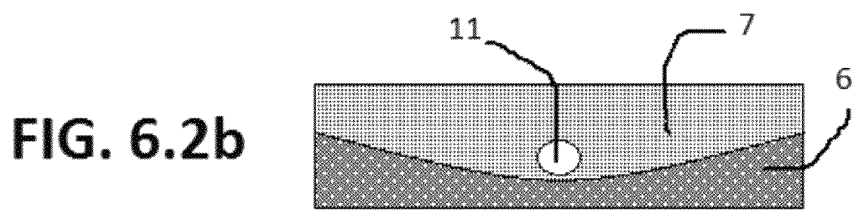

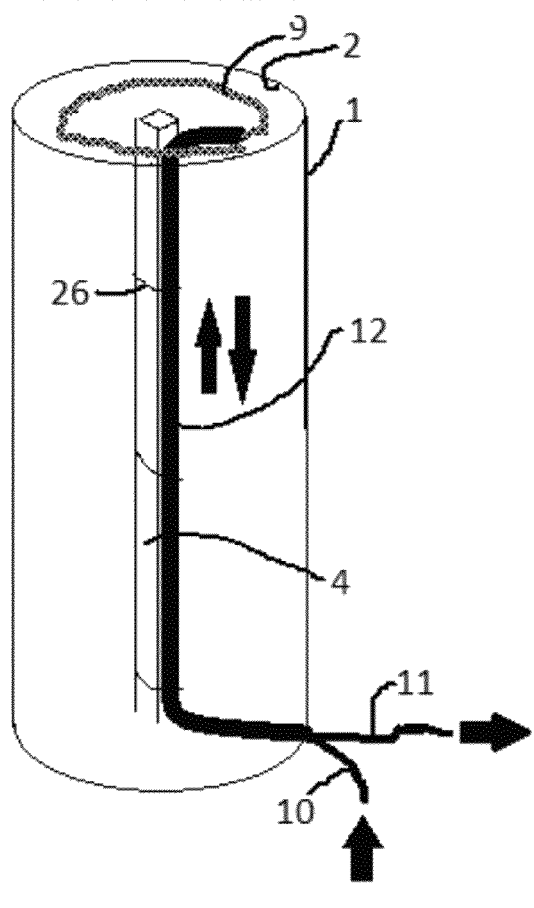
FIG. 7.1a
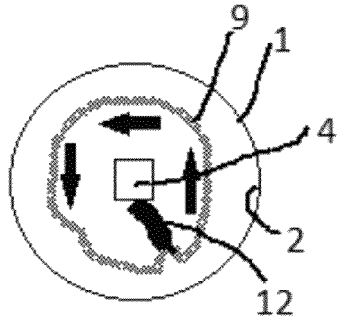
FIG. 7.1b
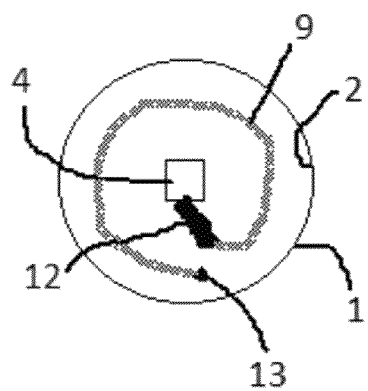
FIG. 7.1c

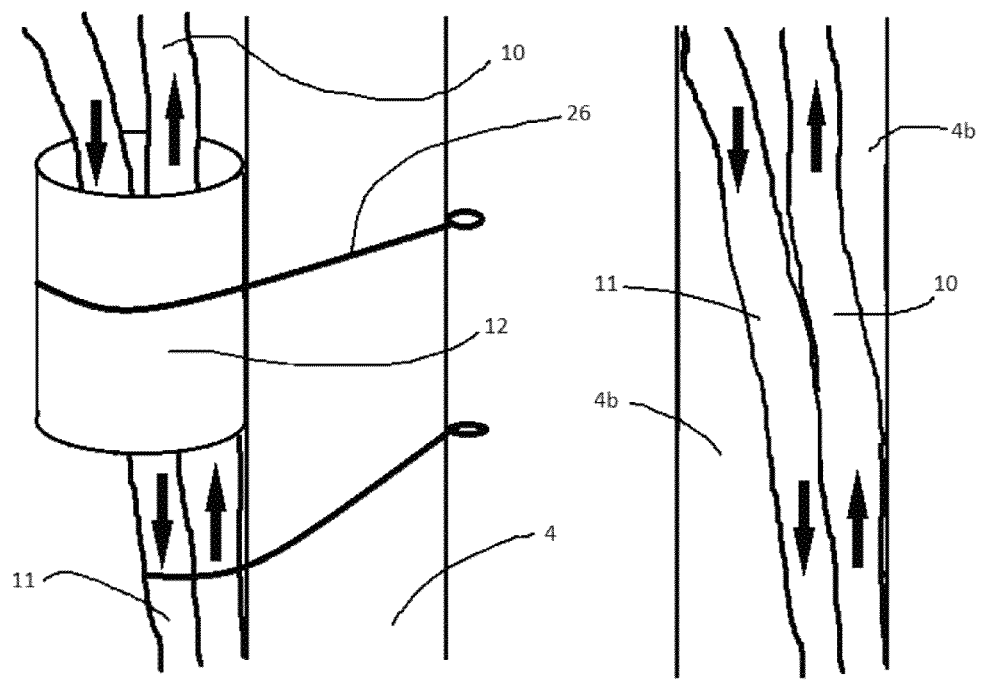
FIG. 7.2a  FIG. 7.2b

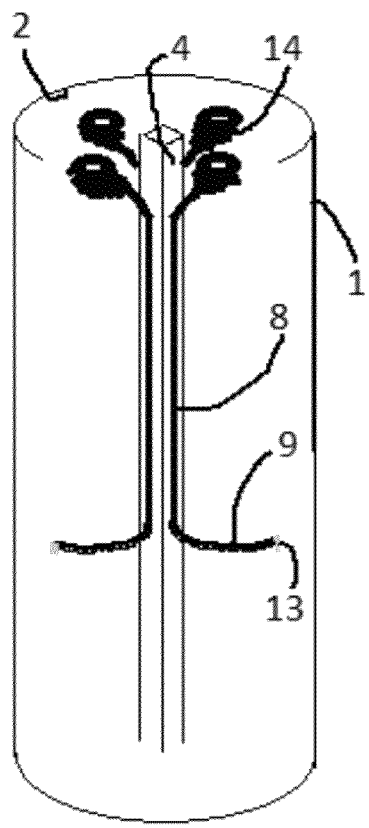
FIG. 7.3
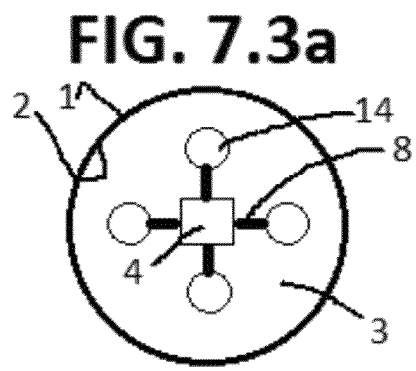
FIG. 7.3a
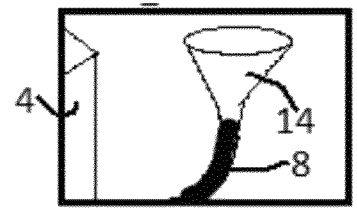
FIG. 7.3b
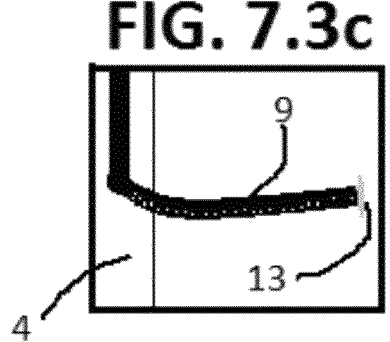
FIG. 7.3c

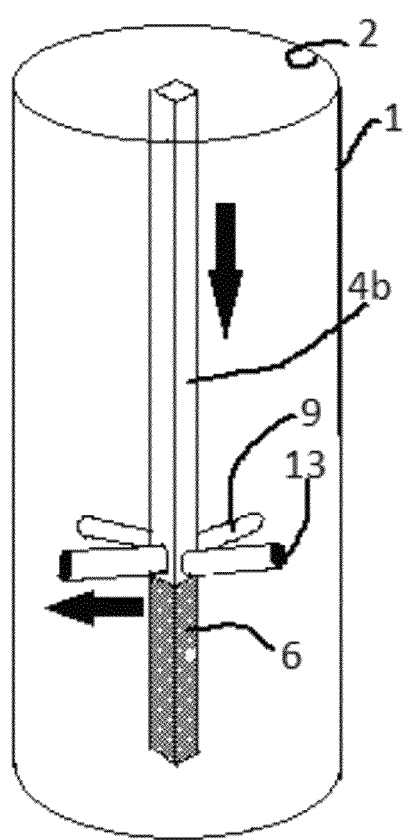
FIG. 7.4
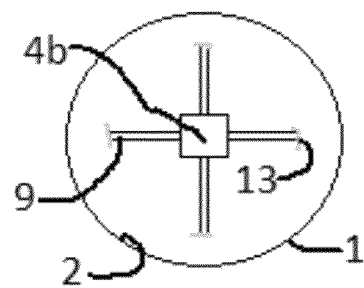
FIG. 7.4a
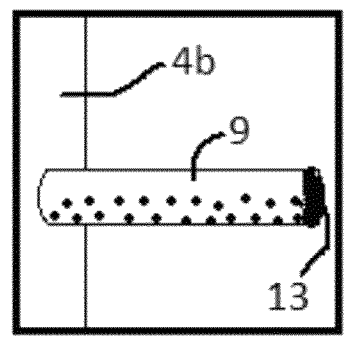
FIG. 7.4b

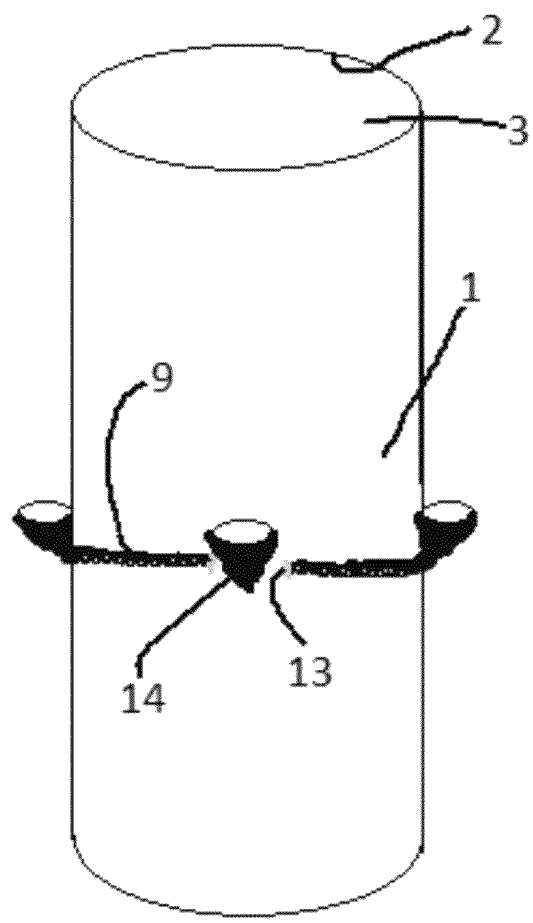
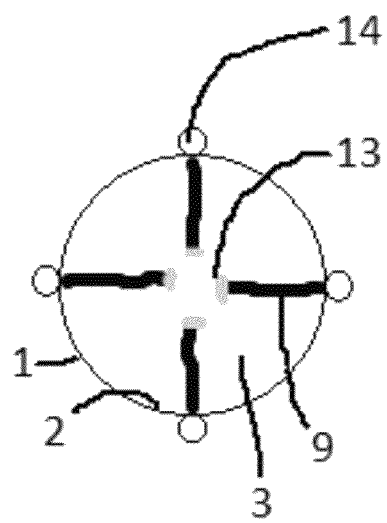

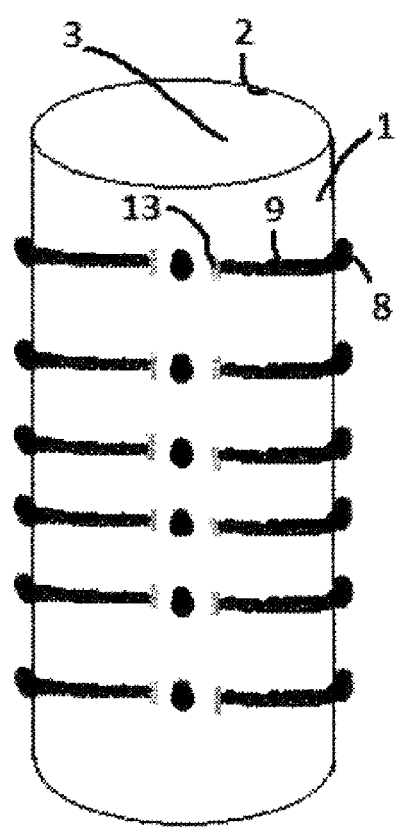
FIG. 7.6
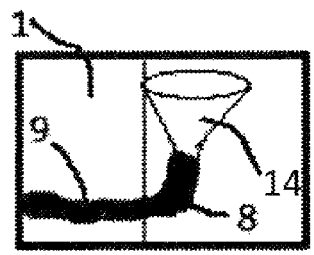
FIG. 7.6a
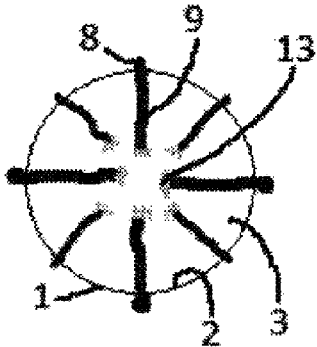
FIG. 7.6b

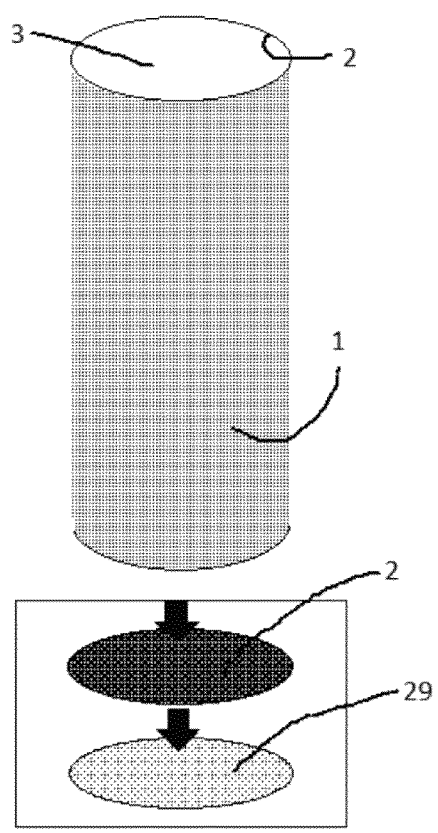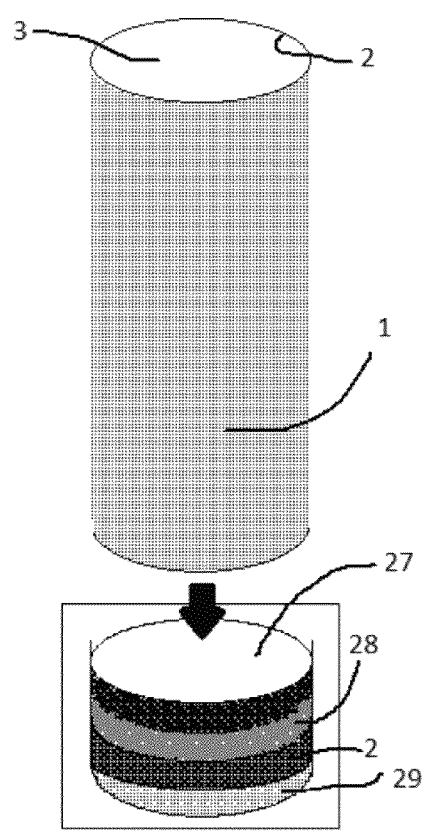
FIG. 8.1a    FIG. 8.1b

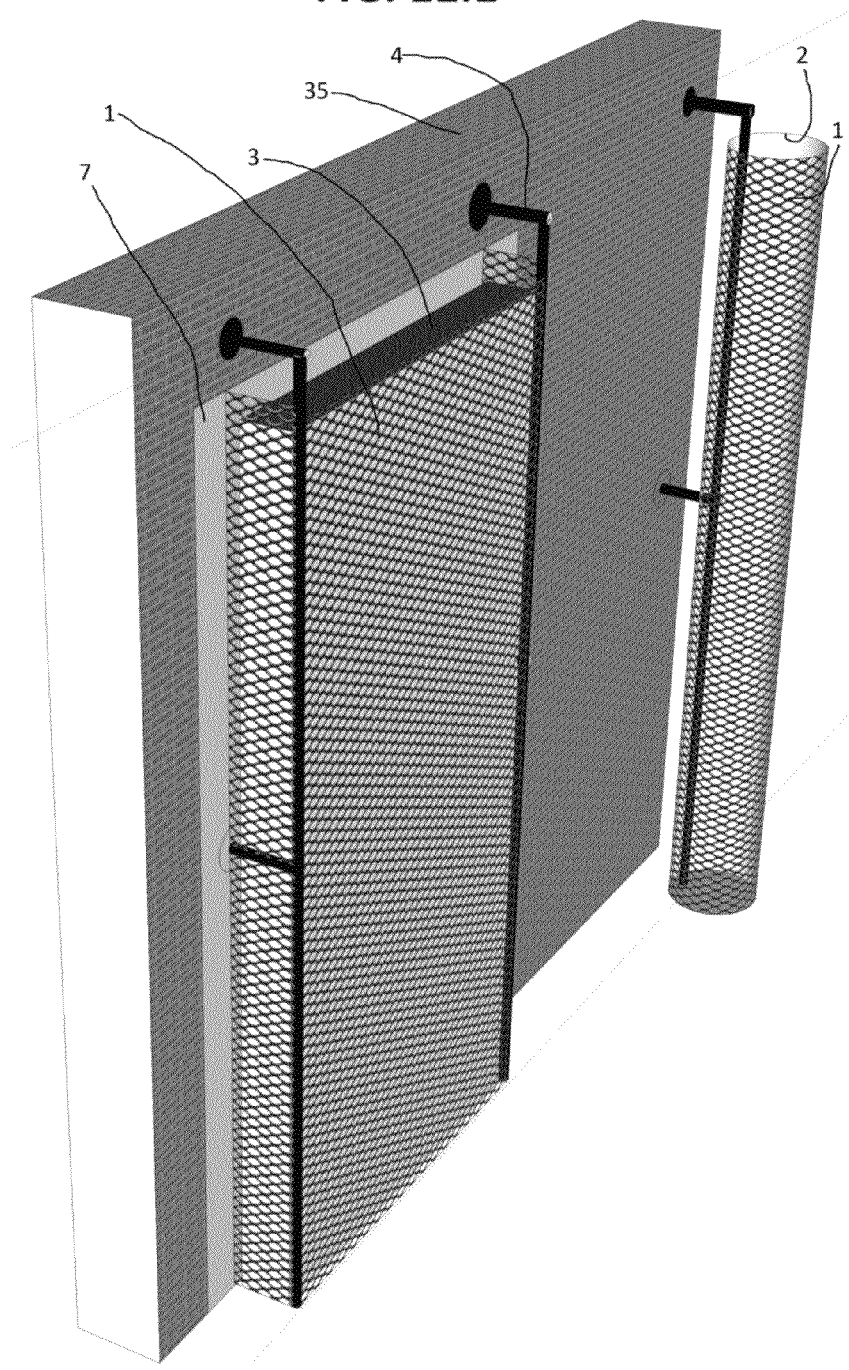
FIG. 11.1

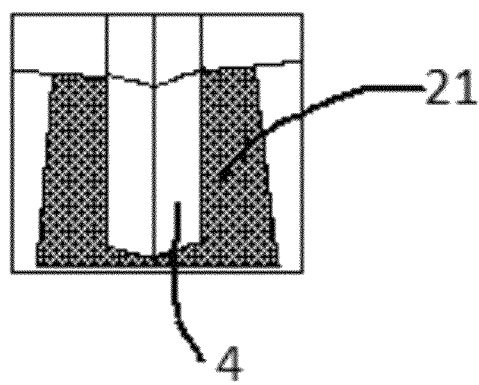
FIG. 16.1a
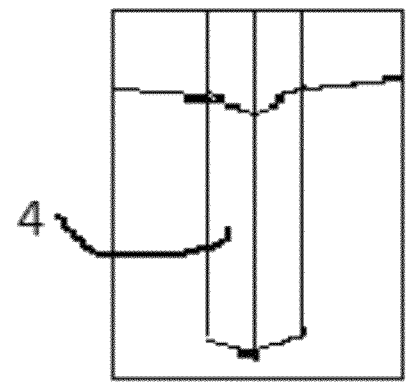
FIG. 16.1b

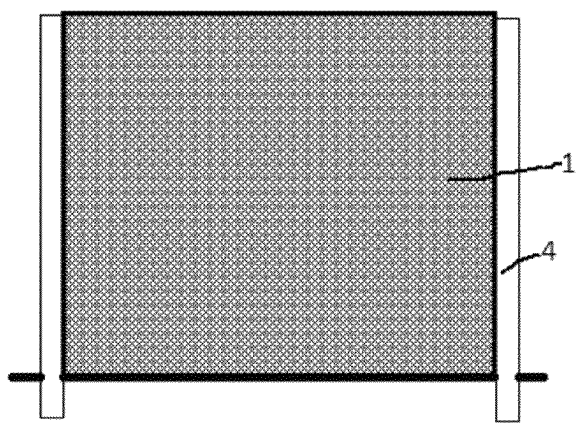
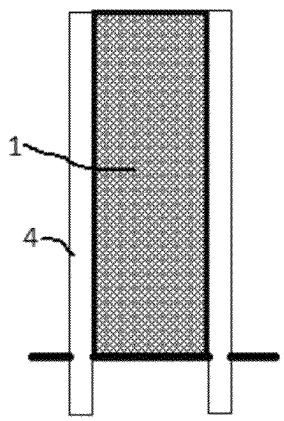
FIG. 17.1a  FIG. 17.1b

FIG. 19
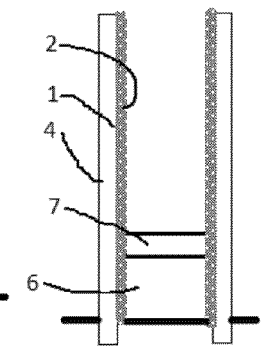
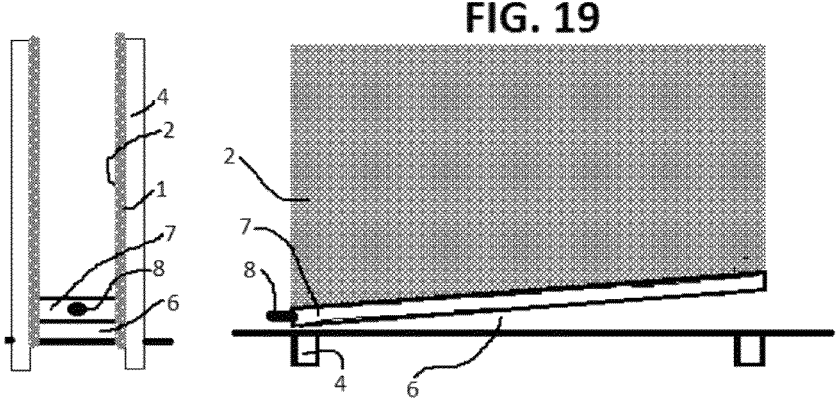
FIG. 19a                    FIG. 19b

FIG. 19.1
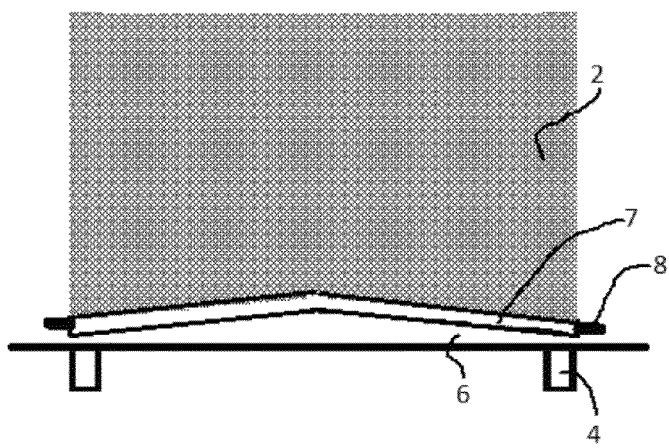
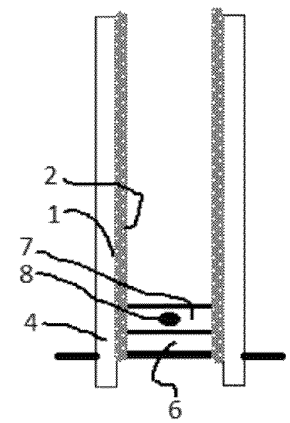
FIG. 19.1a

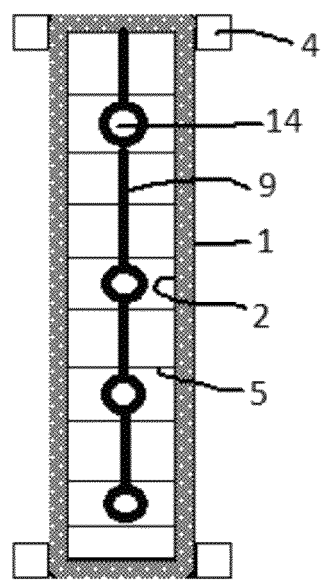
FIG. 21.1a
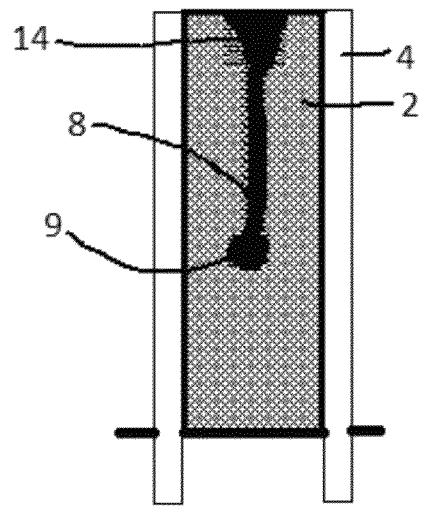
FIG. 21.1b

FIG. 21.2a
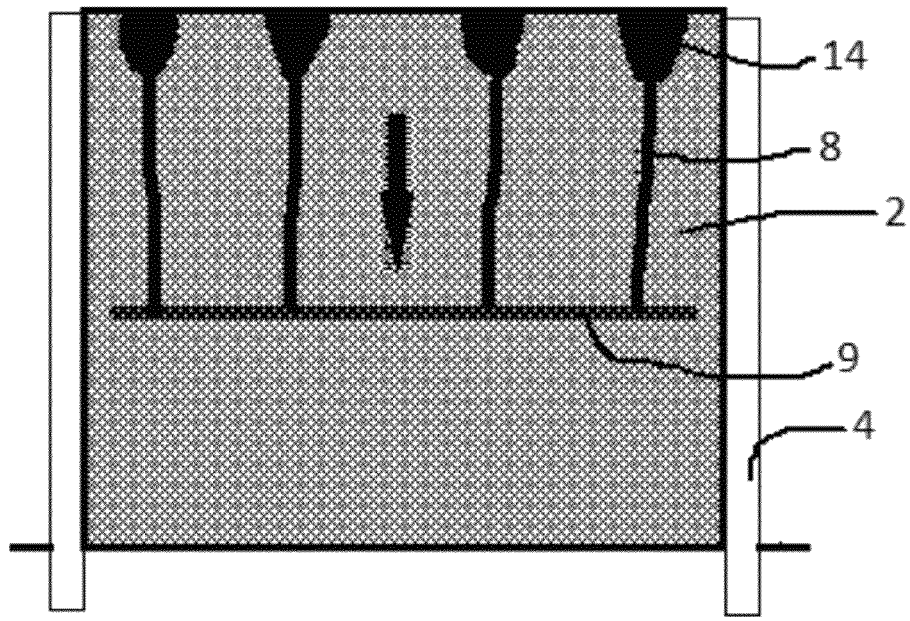
FIG. 21.2b
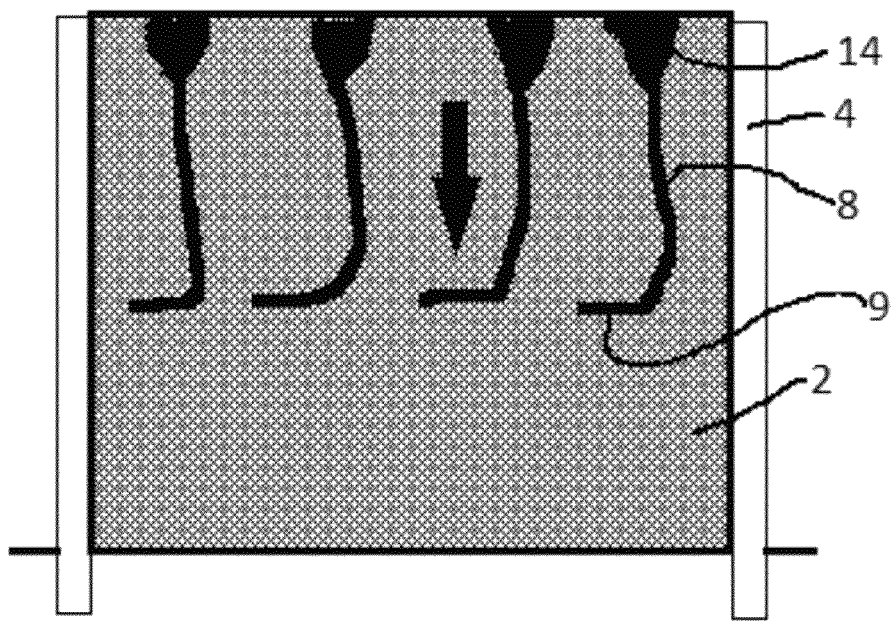

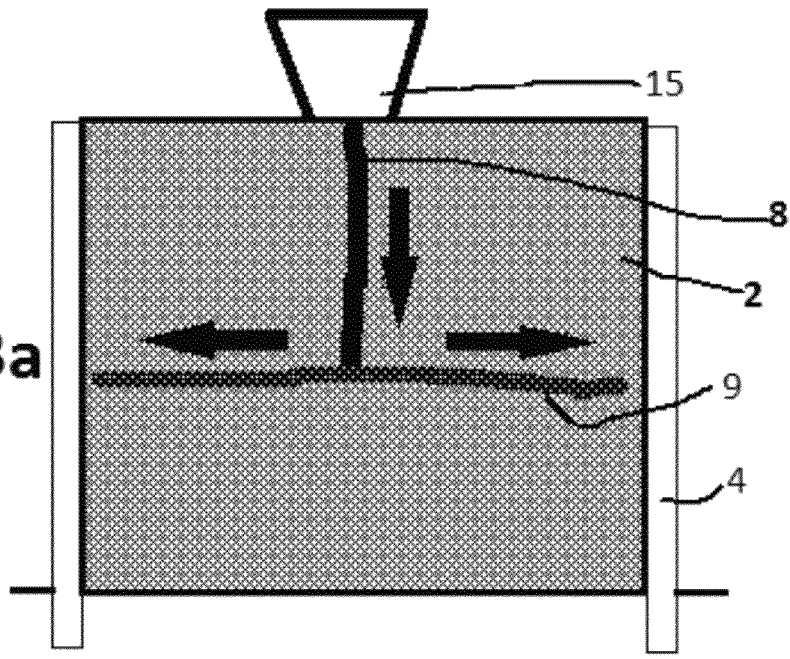
FIG. 21.3a
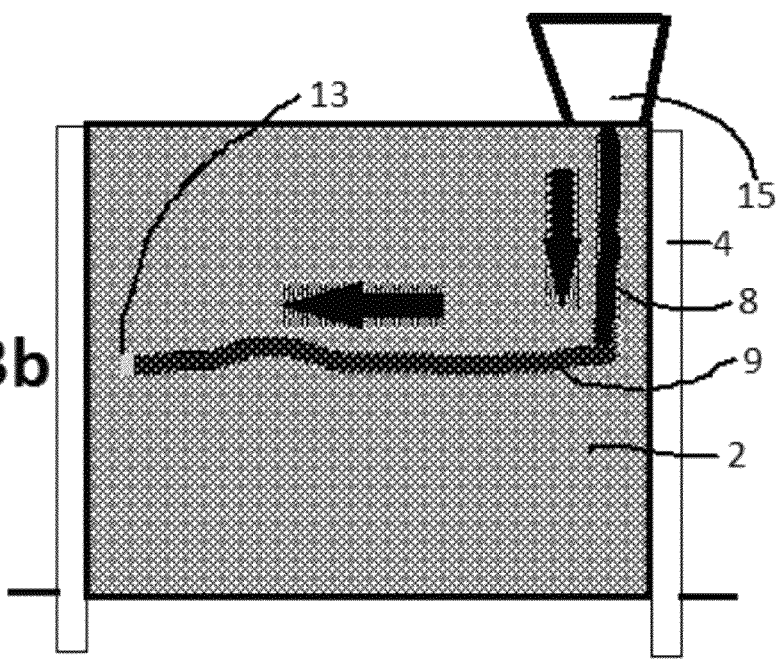
FIG. 21.3b

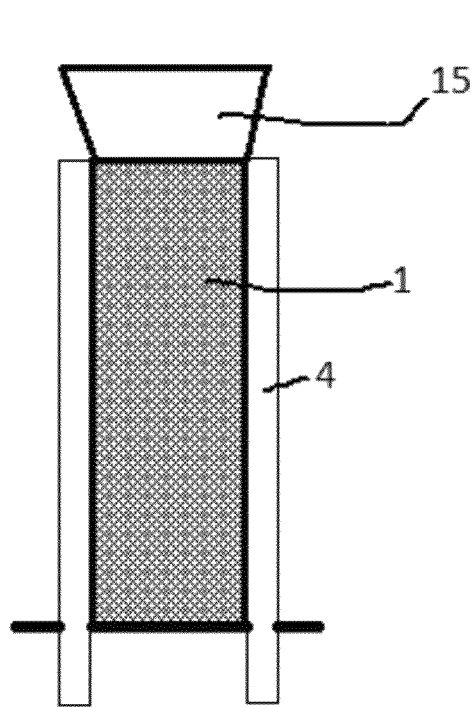
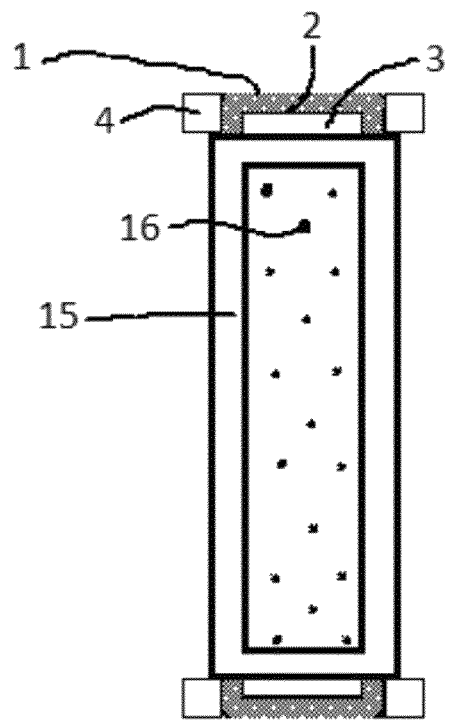
FIG. 21.4a  FIG. 21.4b

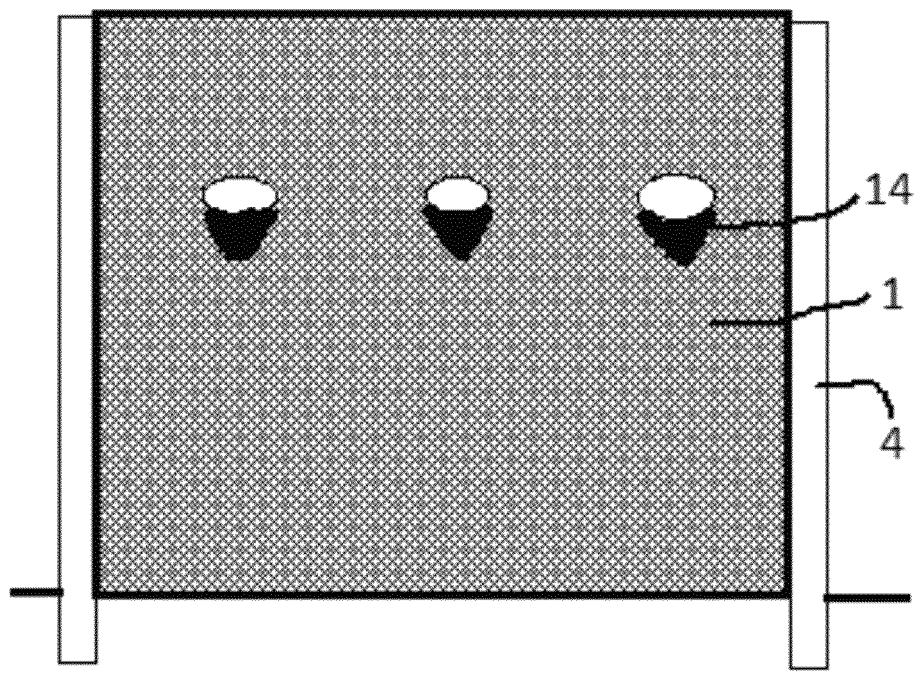
FIG. 21.5

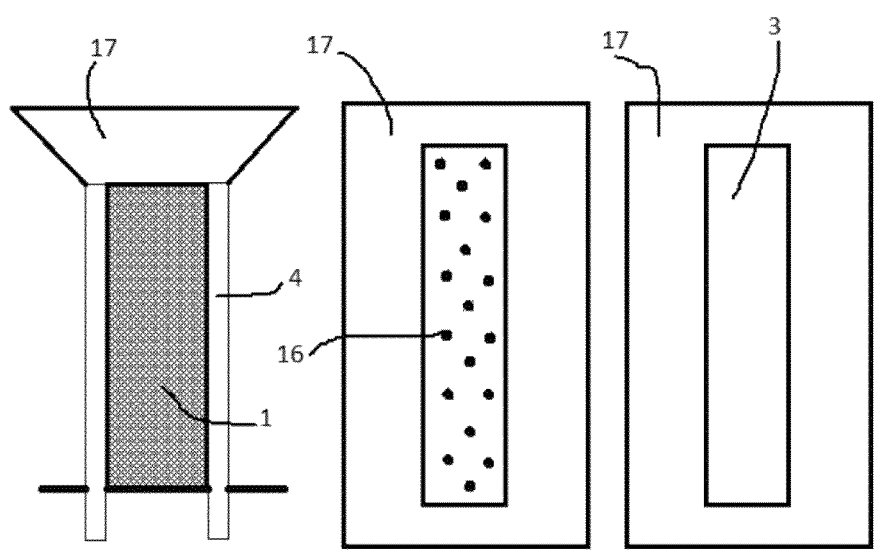
FIG. 21.6   FIG. 21.6a   FIG. 21.6b

FIG. 22
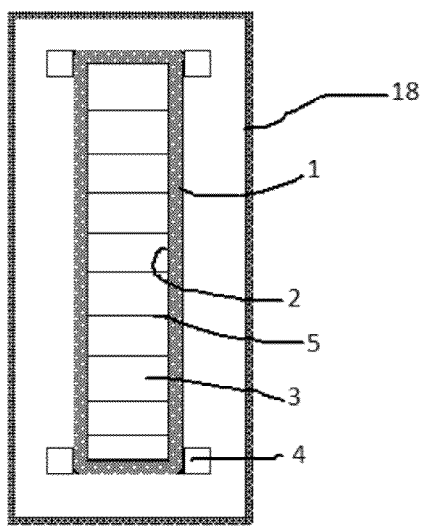
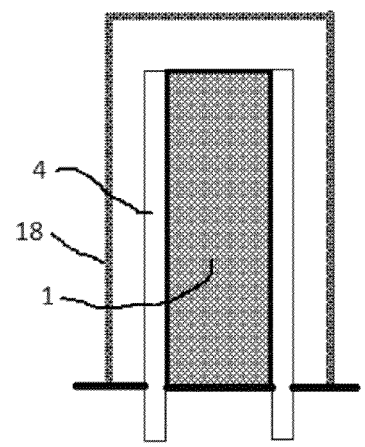
FIG. 22a

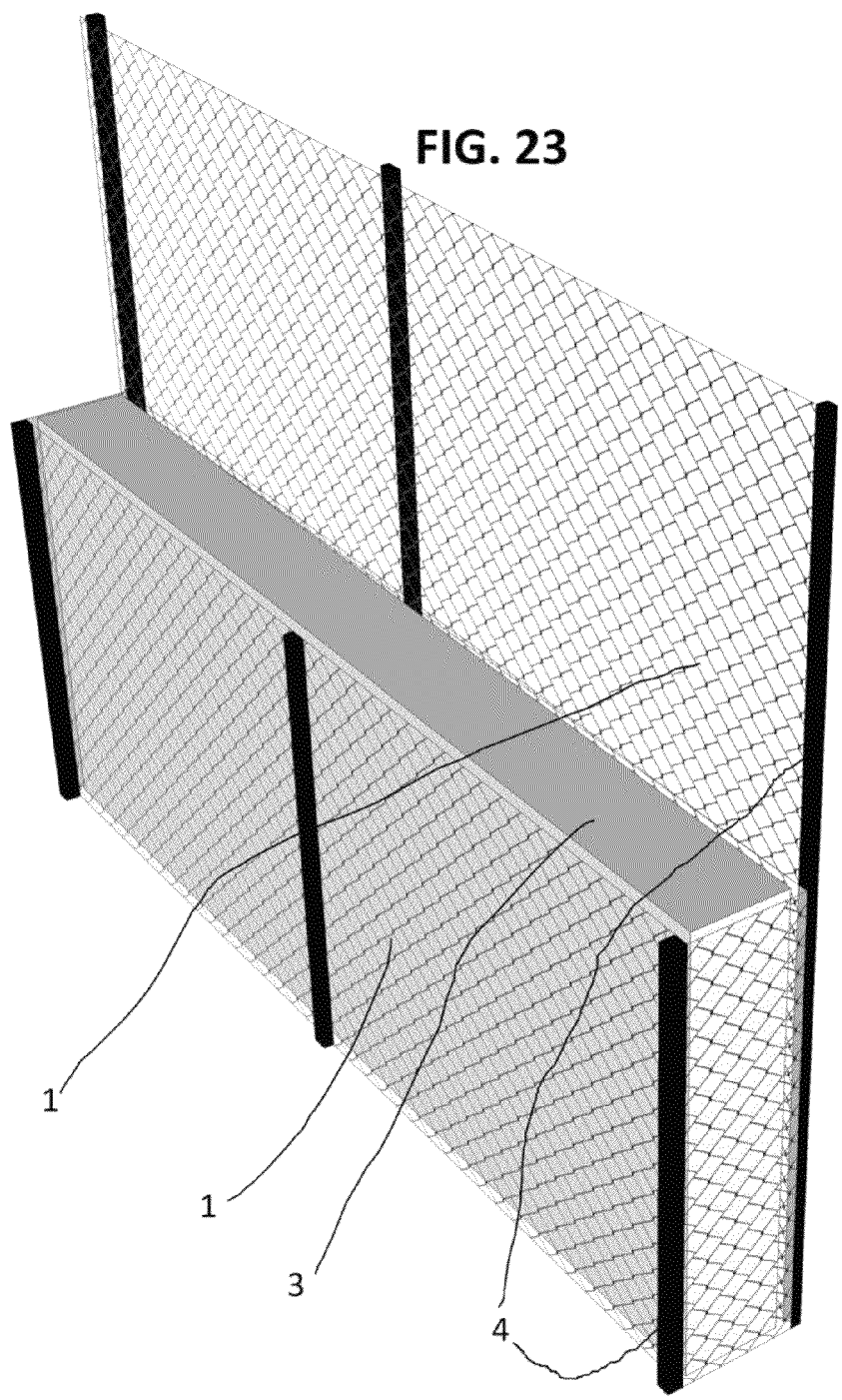

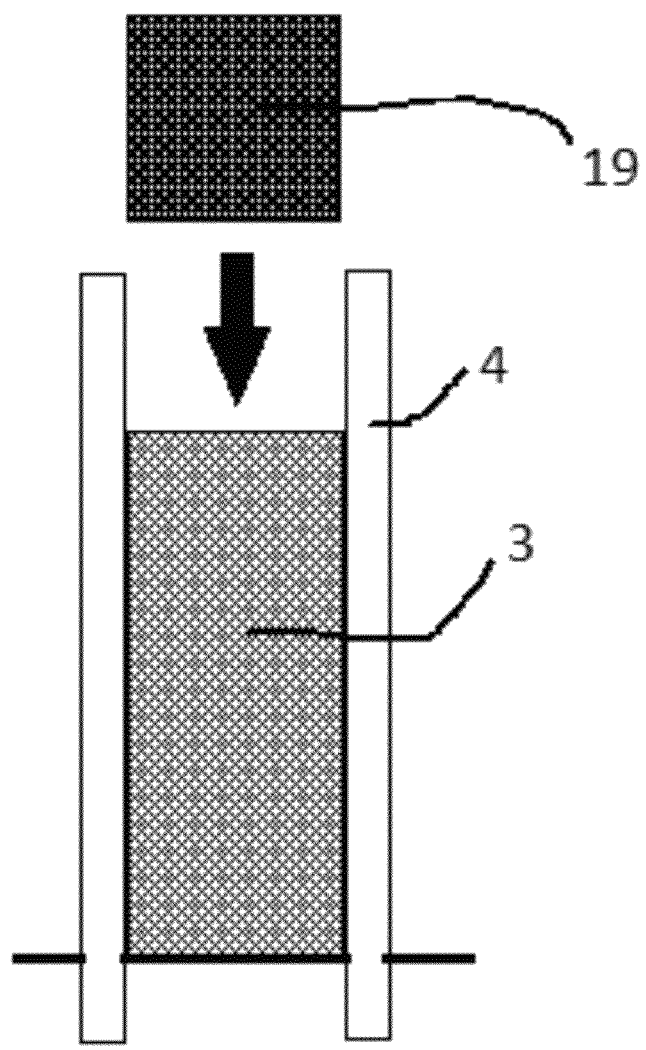

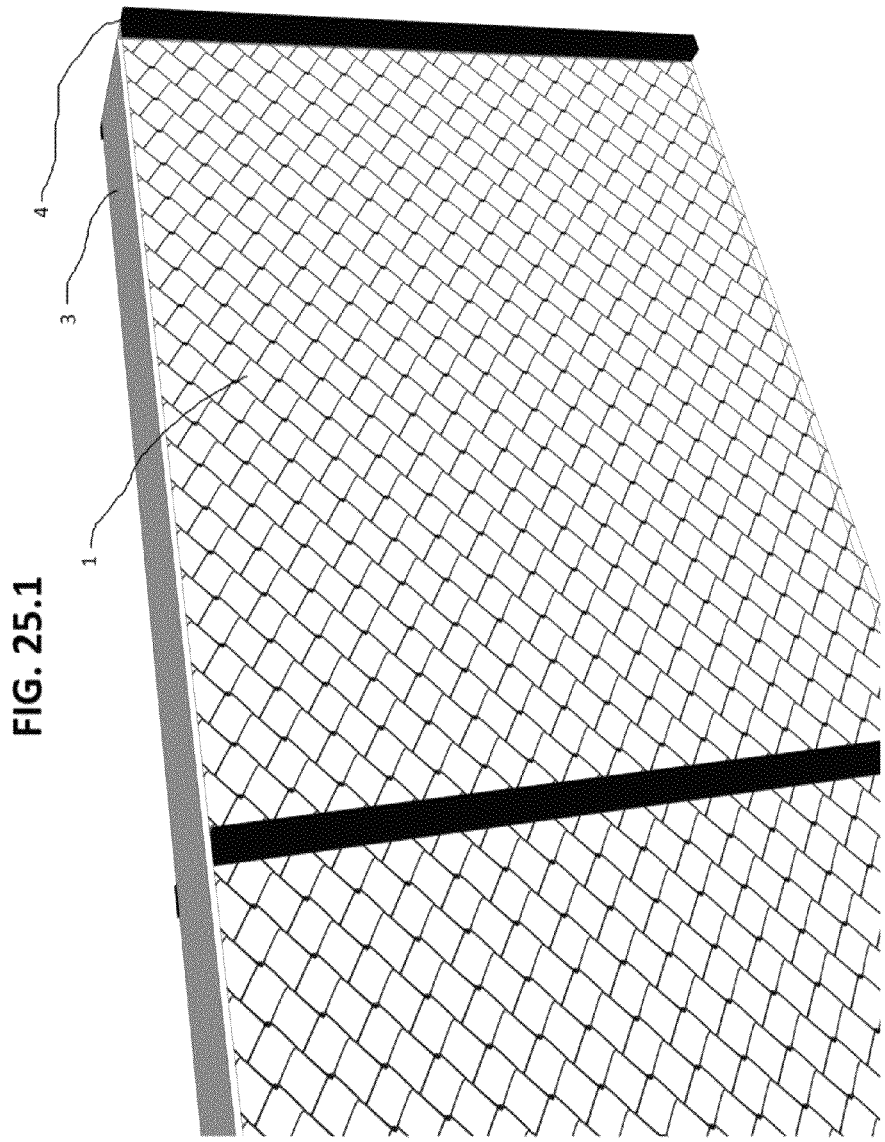
FIG. 25.1

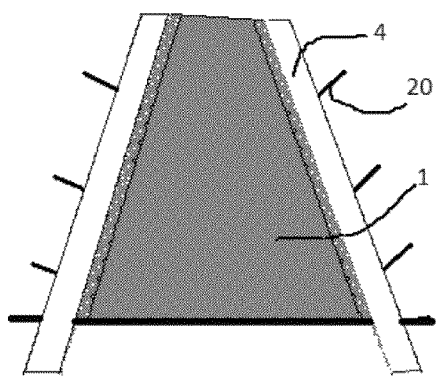 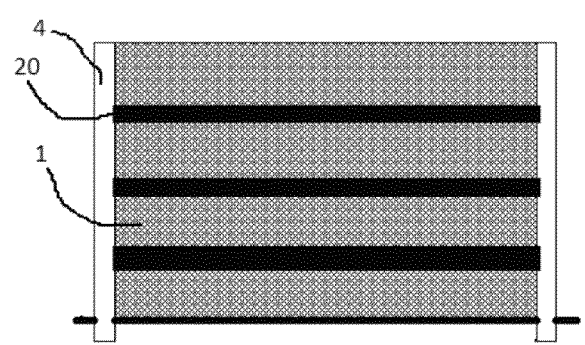
FIG. 26.1a  FIG. 26.1b

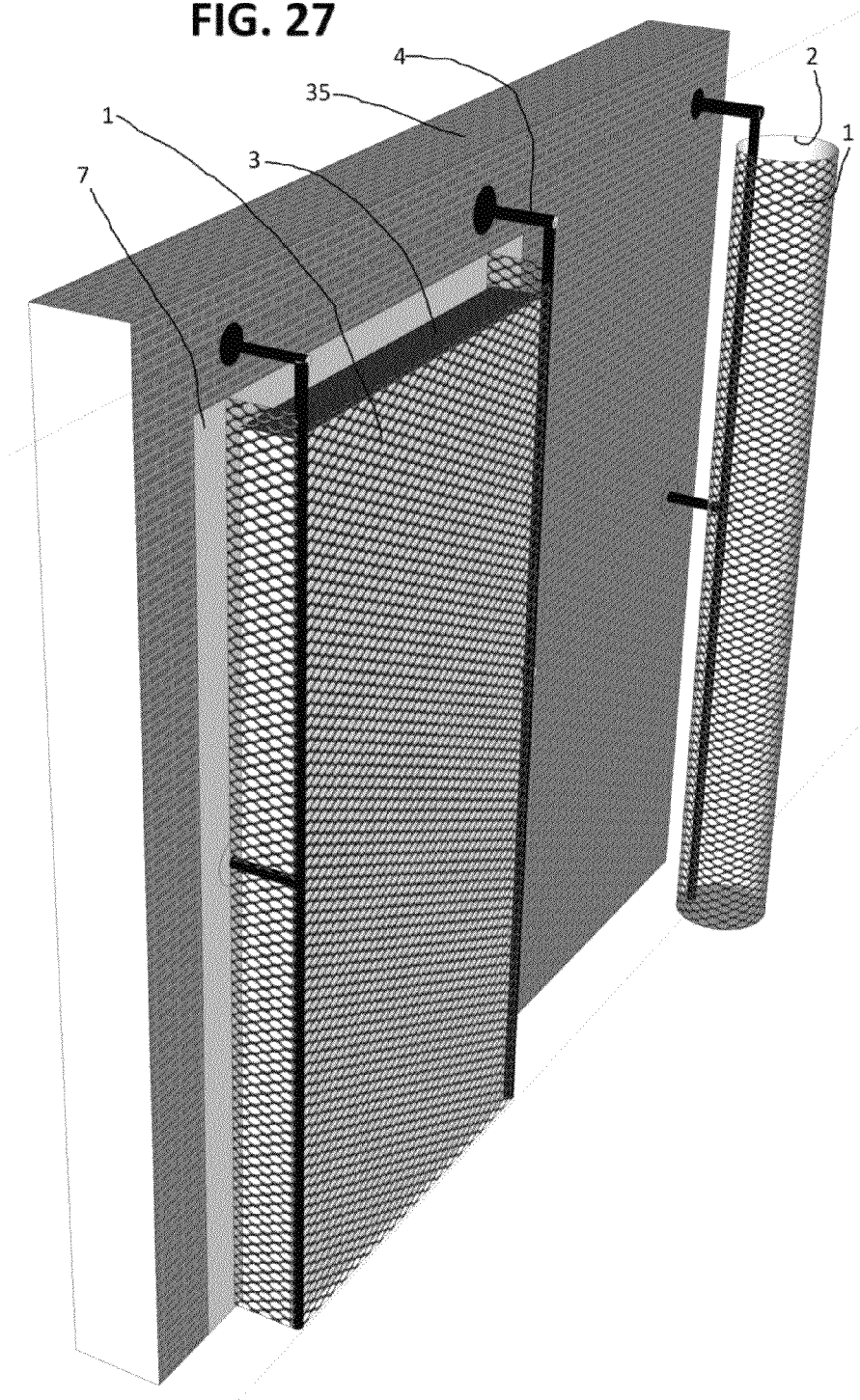

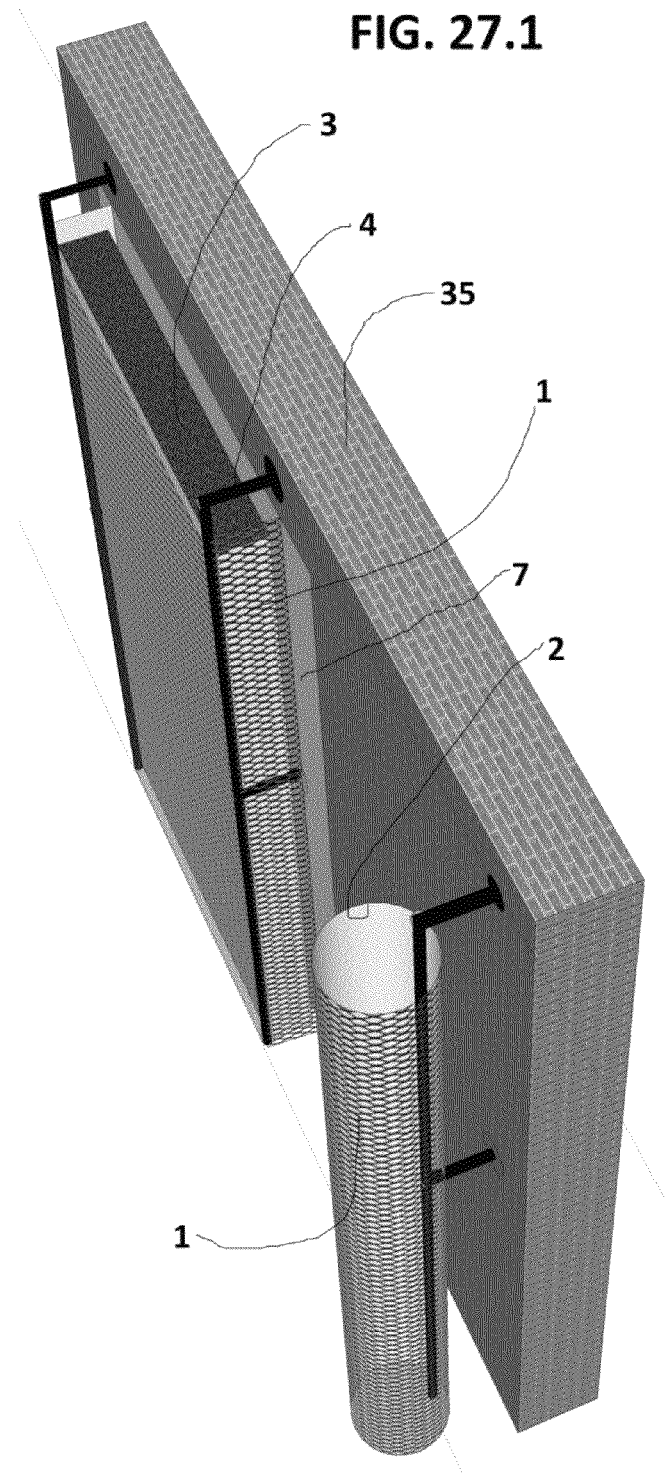
FIG. 27.1

STRUCTURE FOR GROWING PLANTS AND A METHOD OF CREATING THE STRUCTURE

CROSS REFERENCE TO RELATED APPLICATION

This application claims the benefit of U.S. Provisional Patent Application No. 61/522,677, filed Aug. 11, 2011, which is hereby incorporated by reference in its entirety into this application.

BACKGROUND OF THE INVENTION

Can YA Love is dedicated to creating a global community that believes in helping people sustain the basic necessities of life. To achieve this goal we build and develop farming systems that can thrive in some of the harshest and most densely populated environments on Earth.

Can YA Love was created to improve and transform slum communities around the world by teaching residents to create sustainable urban gardens. Our ultimate goal is to catalyze a community of self-reliant growers learning from each other. To achieve this goal, we have created a new kind of gardening system, using what we call a "growing pillar" to increase growing surface area in places like slums where space is often extremely limited. Our work also involves educating youth about how to create these space- and water-efficient gardening systems to grow organic fruits and vegetables for their families and communities.

The inspiration for our growing pillars came from founder Ben Friton's visit to the Kibera slum just outside Nairobi, Kenya. Because of compounding factors like a lack of non-toxic ground space, toxic rainwater run-off, water shortages that make irrigation difficult, and topsoil erosion during the rainy season, the people of Kibera have been growing crops in burlap sacks. By puncturing the fabric and planting seeds in the sides of the sack, families can grow healthy food that is easy to maintain in an informal settlement. These "sack gardens" were cited by many in the community as a critical component of survival during the post-election violence of 2007-08 and the subsequent food crisis. Inspired by this example of self-reliance and sustainability, Can YA Love set out to create an even more productive version of these sacks.

The "growing pillar" technology we've created address a number of problems one encounters when trying to grow food in an urban setting. Most slums around the world are very densely populated, meaning there is no space to grow food in large quantities. In addition, these informal settlement communities do not have sanitation, running water, or adequate soil for large food production. People living in slum conditions do not have a lot of money to buy fresh food from a store and therefore rely on unhealthy foods such as processed and preserved food because they are easily stored and cheap. Can YA Love's vertical garden technology solves all of these problems.

The growing pillar is a vertical structure that can produce 100-130 square feet of growing space while taking only 7-9 square feet of ground space, making them ideal for places where space is limited. Our more productive gardens means more food can be grown then was ever possible before. Because they are separate structures from the ground, the condition of the ground soil is irrelevant. This is important in the places we work where ground soil is toxic from the lack of toilets and sanitation.

Building these gardens in poor communities increases access to low-cost/healthy food. This is as important in places like Kenya as it is in Washington, D.C. Our vertical gardens use timed drip irrigation systems that minimize evaporation and can be built with a water capture system to collect any excess water. Conserving water is very important in places that don't have running water and places that don't see a lot of precipitation, as is the case in Kenya. Because our gardens can be built to any shape and size, shorter varieties are ideal for children, the disabled, and the elderly; populations that are not normally able to garden. In addition to the benefits of using our vertical gardens, Can YA Love teaches the importance of aerobic composting for the health of the garden and the food being grown in it.

Ultimately Can YA Love's objective is to spread the vision of community gardens with a focus on aerobic conditions and collective research & development for the benefit of people all over the world. We collect data from active farmers to find solutions that may help farmers in other corners of the globe. Can YA Love hopes to have sister organizations throughout the world, run by local community activists, who are growing food for their community and sharing their experiences with other farmers and collect local information for local farmers.

SUMMARY OF THE INVENTION

In one aspect, the present invention provides a structure to grow plants, the structure comprising a fence, a fabric attached to the fence to form a fence-fabric combination, wherein the fence-fabric combination is in the shape of a vertical pillar with an enclosed area, and a growing material filled in the enclosed area.

In another aspect, the present invention provides a method for creating a structure to grow plants, the method comprising providing a fencing material and a fabric, attaching the fabric to the fencing material to form a fence-fabric combination, shaping the fence-fabric combination into a pillar with an enclosed area, and filling the enclosed area with a growing material.

BRIEF DESCRIPTION OF THE DRAWINGS

FIG. 1.1 is a perspective view of a growing pillar, according to an exemplary embodiment.

FIG. 1.2 is a perspective view of a growing pillar filled with soil, according to an exemplary embodiment.

FIG. 4.1a is a view of a support post with additional structural support, according to an exemplary embodiment.

FIG. 4.1b is a view of a support post with an alternative additional structural support, according to an exemplary embodiment.

FIG. 4.2a-4.2c show views of a growing pillar with attached tension cables, according to an exemplary embodiment.

FIG. 5.1-5.2 are views of plants being planted in a growing pillar, according to an exemplary embodiment.

FIG. 6 is a view of a growing pillar with a water capture system, according to an exemplary embodiment.

FIGS. 7.1-7.6 are views of a growing pillar with an irrigation system, according to an exemplary embodiment.

FIGS. 8.1a-8.1b are views of a growing pillar with a water filtration system, according to an exemplary embodiment.

FIGS. 15-22 are process views showing the construction of the growing pillar shown in FIG. 14, according to an exemplary embodiment.

FIG. 23 is a view a growing pillar formed in a wall shape having one side raised, according to an exemplary embodiment.

FIG. 24 is a process view showing a growing pillar being refilled, according to an exemplary embodiment.

FIG. 25.1 is a view of a growing pillar with a wind passage hole, according to an exemplary embodiment.

FIGS. 26.1a-26.1b are views of a growing pillar with angled sides and water catching tabs, according to an exemplary embodiment.

FIGS. 27-27.1 are views of growing pillars affixed to an existing support medium.

DESCRIPTION OF THE PREFERRED EMBODIMENTS

Hereinafter, exemplary embodiments of the present invention will be described in greater detail with reference to the drawings, wherein like numerals refer to like parts throughout.

As a preliminary note, all the described structures are preferably made with the attempt of using materials that are easily available and or affordable in most corners of the world. Of note, the larger the structure, the stronger the materials needed and/or extra structural supports will be needed. Factors such as the number of support posts and the gauge of the material used for the fencing will be influenced by the shape and size of the structure. Preferably, the pillar structure is made in any shape that encloses an area to be filled and that is structurally sound. The various embodiments of the invention may be used for food production, as beneficial insect attractants, aesthetics, and for use by people with special needs young and old (e.g., persons with bad backs or who must use a wheelchair do not need to bend down to reach the ground as in traditional gardens, but can grow plants by accessing a portion of the growing structure that is at a vertical level most convenient to them).

FIG. 1.1 is a perspective view of the growing pillar. The growing pillar in its basic form requires a fencing 1 for support, and a fabric 2 for retention of soil 3 or other material. The fencing 1 should be sufficiently strong to support the pillar structure when it is filled with the soil 3 or other material. The fencing 1 is preferably made from a light weight material so that it the growing pillar can be easily assembled. The fencing 1 is also preferably malleable such that it can be easily bent into a variety of shapes. The fencing 1 preferably has openings through which the fabric 2 may be accessed. The fabric 2 is attached to the fencing 1 using a thread and needle, or other method that allows for the fabric 2 to stay adhered to the fencing 1. The fabric 2 is preferably made from a non-leaching and non-biodegradable material that does not permit the growing material 3 or water to pass through, but does permit air to pass through. The fabric 2 may alternatively allow water to pass through at a slow rate, or absorbs the water to create a moist surface.

Figure 2:
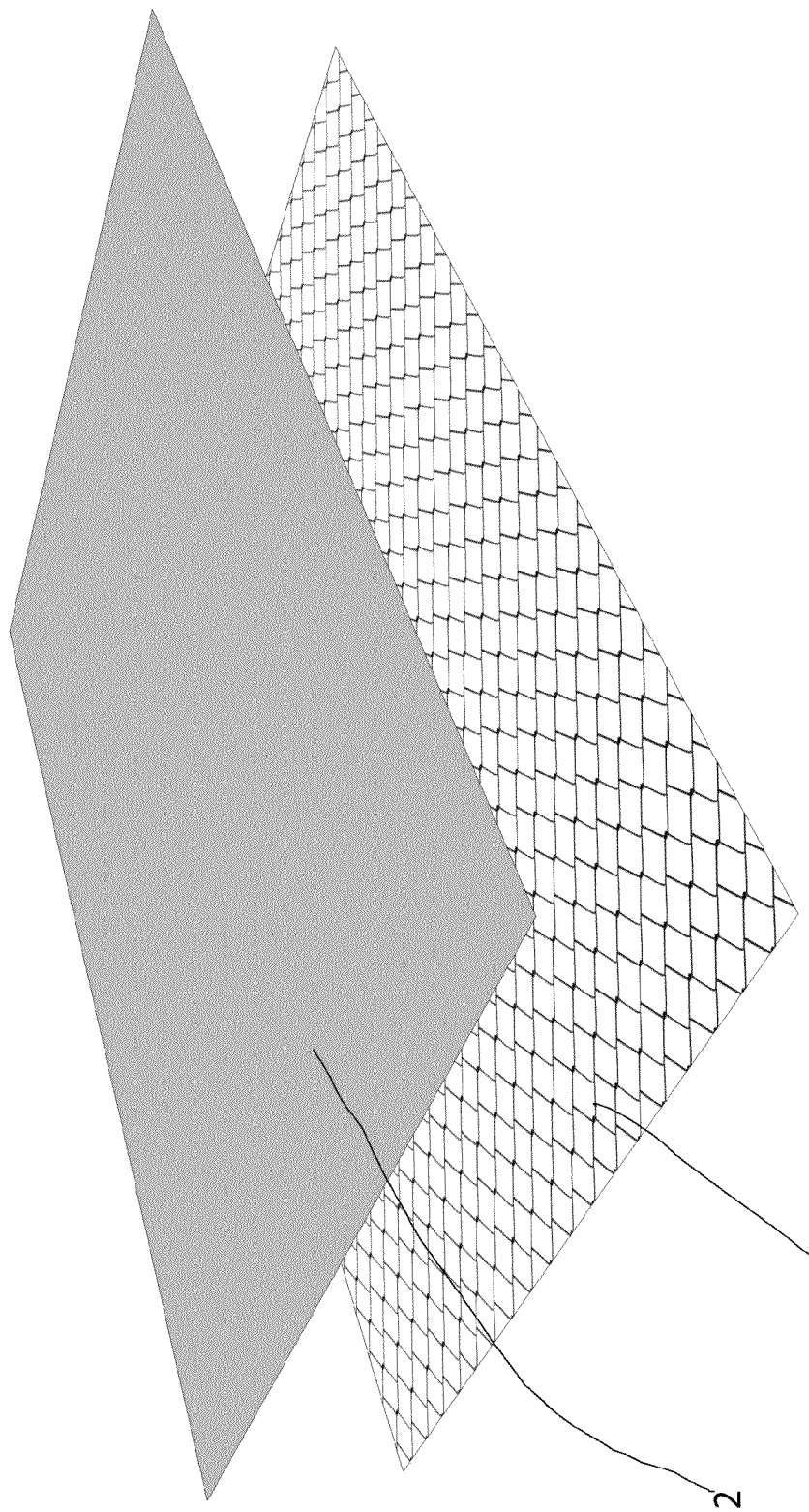
FIG. 2 is a process view showing the fabric being attached to the fencing, according to an exemplary embodiment.
Figure 3:
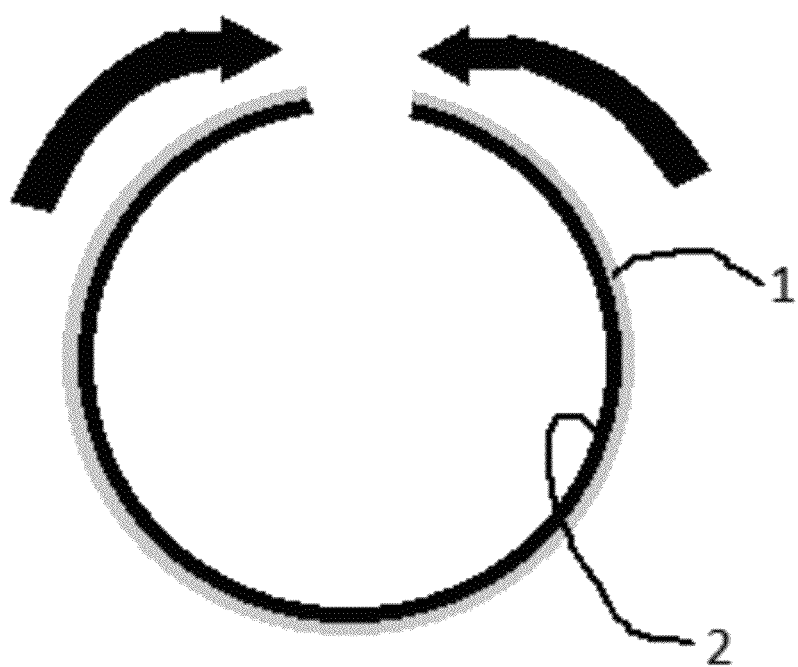
FIG. 3 is a process view showing the fence-fabric combination being formed into a cylindrical shape, according to an exemplary embodiment.

FIG. 2 shows the fencing 1 formed into a flat plane. The fabric 2 is positioned parallel to the fencing 1. The fabric 2 is then attached to the fencing 1. Once the fabric is attached to the fencing, the fence-fabric combination is bent into a cylindrical shape, as shown from the top-down perspective in FIG. 3. The two ends of the fence-fabric combination that meet each other may be attached with a portion of the fencing 1 that extends past the attachment of the fabric 2. The two ends of the fence-fabric combination may also be pulled together and fastened using wire or other material that will hold the two ends together.

Once the growing pillar is formed as shown in FIG. 1.1, the area enclosed by the growing pillar is filled with a combination of soil, compost, or other materials that will provide sustenance to one or more variety of life forms. For example, depending on the type of plant that is intended to be grown, the growing pillar may be filled with material that provides the optimal nutrition to that specific type of plant. If more than one type of plant is intended to be grown, the material may be such as to provide optimal nutrition to each type of plant, or the material may be designed to provide a certain level of nutrition to each type. The material may also be designed to provide nutrition to a variety of other organisms that may aid in the growing of the plants. For the purpose of describing the preferred embodiments, it is assumed that the growing pillar is filled with soil 3 as shown in FIG. 1.2.

Figure 5:
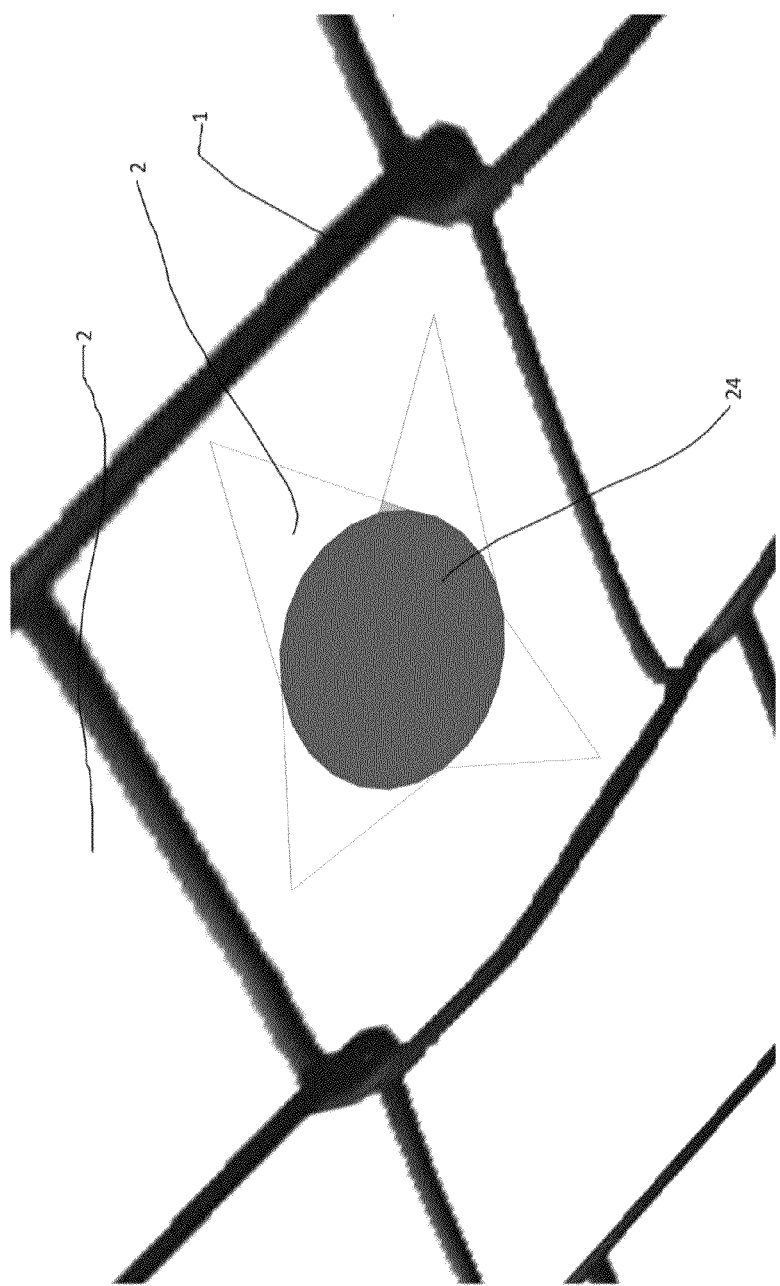
FIG. 5 is a zoomed-in view of an opening created to plant a plant, according to an exemplary embodiment.

For planting, the fabric 2 is penetrated through the fencing 1 from the outer side of the growing pillar to create an opening. A small amount of soil 3 may be extracted from the opening to from a hole large enough for the root ball of the plant to be grown to be placed. A hole may also be formed in the soil 3 from the top of the growing pillar where the soil 3 is directly exposed so that a plant may be grown on the top. FIG. 5 shows a close up view of a portion of the growing pillar, illustrating the fencing 1, fabric 2, and opening 24 into the soil.

Figure 4A:
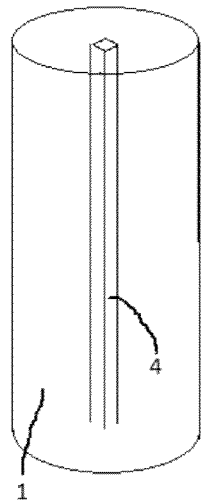
FIG. 4a is a perspective view of a growing pillar with an internal support post, according to an exemplary embodiment.
Figure 4C:
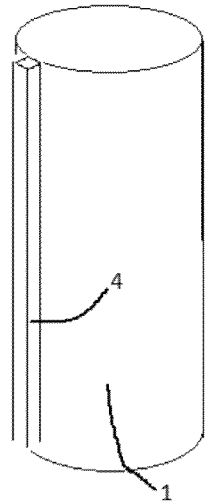
FIG. 4c is a perspective view of a growing pillar with an external support post on one side of the growing pillar, according to an exemplary embodiment.
Figure 4E:
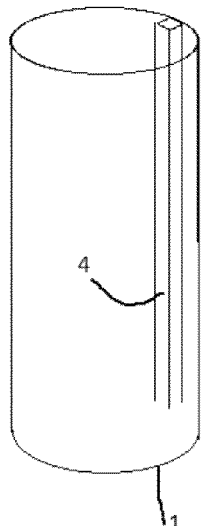
FIG. 4e is a perspective view of a growing pillar with an external support post on another side of the growing pillar, according to an exemplary embodiment.
Figure 4B:
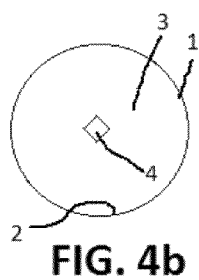
FIG. 4b is a top-down view of a growing pillar with an internal support post, according to an exemplary embodiment.
Figure 4D:
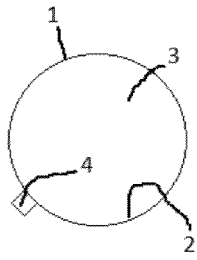
FIG. 4d is a top-down view of a growing pillar with an external support post on one side of the growing pillar, according to an exemplary embodiment.
Figure 4F:
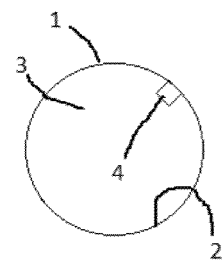
FIG. 4f is a top-down view of a growing pillar with an external support post on another side of the growing pillar, according to an exemplary embodiment.

FIGS. 4a-4f illustrate exemplary embodiments of the growing pillar with support posts 4 to fortify the growing pillar. The support posts 4 may be provided with additional structural support 21, as shown in FIGS. 4.1a-4.1b, by securing the base of the support posts 4 with the additional structural support 21 being formed below ground level. The additional structural support 21 may be cement, or other suitable material. The support posts 4 may be positioned on the exterior of the growing pillar as shown in FIGS. 4c-4f, or may be placed on the interior of the growing pillar as shown in FIGS. 4a-4b. Although depicted as rectangular prisms in the provided drawings, the support posts 4 may be of any shape including a cylindrical shape, a shape with branch-like or geometric protrusions, or any combination thereof. The greater structural integrity provided by the support posts 4 allows the growing pillar to be constructed to greater heights to create more surface area for growing plants.

FIG. 4.2a illustrates an exemplary embodiment of the growing pillar with supporting wires 5. Supporting wires 5 may be used in addition to, or in place of the support posts 4, and may be used to connect the growing pillars with one another, or to the ground or other stable surface.

FIG. 4.2b is a top-down view of the growing pillars in FIG. 4.2a. FIG. 4.2b is a top-down view of the growing pillars in FIG. 4.2a showing an alternative placement of the supporting wires 5.

FIGS. 5.1 and 5.2 illustrate plants being planted in a growing pillar. A variety of plants may be planted in the growing pillars, preferably edible plants such as fruits and vegetables, but plants may also be planted for aesthetic, medicinal, or other purpose. For the purpose of the describing the preferred embodiments, it is assumed that the plants being grown are vegetables. When growing vegetables, it is preferable that root vegetables 25 are grown on the top of the growing pillar by placing them in hole 24, as shown in FIGS. 5.2a-5.2b, and other vegetables 22 are grown on any surface, such as on the side, by placing them in hole 23, from which the root 23 can reach the soil 3. To achieve optimal growth, the plants should be planted with sufficient spacing in between. Additionally, for vines and other heavy plants, support structures may added as is done in typical garden and farm settings. For example, string and bands may be used to tie vines and bushy vegetables to the fencing 1 so that the vines do not fall or block sunlight to other plants. The supporting wires 5, for example, may be used to serve additional purposes such as a growing trellis for vines.

FIG. 6 illustrates an exemplary embodiment of a growing pillar with a water capture system. The water capture system may be formed at the bottom of the growing pillar by placing filler material 6 to prevent the excess water from seeping into the ground, and by placing a plastic sheet or other water repellant material 7 around a portion of the base to prevent the water from seeping out of the sides of the growing pillar. The water capture system is designed to capture all excess water that went unabsorbed in the soil or plants. This water capture system may be designed and implemented to additionally capture beneficial micro organisms, acids, and nutrients. The captured water exits the growing pillar through outlet 11, and can diverted to other growing pillars or reused for irrigation. FIG. 6.1a is a top-down views of the water capture system, and FIGS. 6.2a-6.2b are side views of the water capture system.

FIGS. 7.1-7.6 illustrate exemplary embodiments of the growing pillar with an irrigation system. A basic form of irrigation is by manually pouring water (gently) into the top of the pillar or through the side of the pillar using funnels to inject the water deeper into the soil. Alternatively, automated systems may be used, such as a water inlet 10 that enters the growing pillar and extends vertically upward to the top of the growing pillar. The inlet 10 connects to a soaking tube 9 at the top of the growing pillar through which water enters the soil 3. The soaking tube 9 may be made of a porous material that lets the water seep into the surrounding soil. Alternatively, the soaking tube 9 may be made of a non-porous material with holes or slits to let the water seep into the surrounding soil, or a combination of porous and non-porous material. The soaking tube 9 may terminate at the top of the growing pillar, in which case it is capped with cap 13. Alternatively, the soaking tube 9 may be reattached to the outlet 11 that extends vertically down and/or out of the growing pillar to connect to another growing pillar, growing wall or other destination. The irrigation system may additionally be fitted with a timer to automate the irrigation by controlling the flow of water. The vertical extensions of the inlet 10 and outlet 11 may be protected by tying them to support post 4 with holding straps 26, or otherwise attaching the inlet 10 and outlet 11 to support post 4, or fencing 1, or encasing in protective tube 12, or placing in hollow support post 4b, or any combination thereof, as shown in FIGS. 7.2a-7.2b.

FIGS. 7.3 and 7.3a-c illustrate an alternative exemplary embodiment of the growing pillar with an irrigation system. Instead of an inlet/outlet system, funnels 14 are placed on the top of the growing pillar. The funnels 14 are connected to water tube 8 that extends into the soil and connects to soaker tubes 9 capped with caps 13. Water may be provided into the funnels by artificial means (e.g., water hose, irrigation) or natural means (e.g., rain), or a combination thereof. Water flows down water tube 8 and is absorbed into the soil 3 through the soaker tubes 9. FIG. 7.3a is a top-down view of FIG. 7.3.

FIGS. 7.3b and 7.3c are zoomed-in views of the irrigation system illustrated in FIG. 7.3. Preferably, especially when relying on natural water source, such as rain water, the funnels 14 send the collected water to the lower portions of the growing pillar and then into soaker tubes 9. By directing the collected water deeper into the soil 3 before allowing it to be absorbed, oversaturation of the soil in the upper portion of the growing pillar is prevented. The water not collected in the funnels 14 penetrates the soil 3 from the top, and the collected water penetrates the growing pillar from the middle, so the water is absorbed into the soil 3 more evenly. The vertical extension of water tube 8 may be protected in a similar fashion to the vertical portions of the inlet 10 and outlet 11 in FIG. 7.2 as described above.

FIGS. 7.4, 7.4a, and 7.4b illustrate an alternative exemplary embodiment of the growing pillar with an irrigation system. In this embodiment, a hollow support post 4b is provided that is filled from the top to a desired height. Soaker tubes 9 extend from the hollow support post 4b to a desired length into the soil 3. When the hollow support post 4b is filled with water, it can slowly release the water directly into the lower portions of the pillar via the soaker tubes 9.

FIGS. 7.5 and 7.5a illustrate an alternative exemplary embodiment of the growing pillar with an irrigation system. In this embodiment, funnels 14 are provided on the sides of the growing pillar.

Different embodiments of the growing pillar with an irrigation system may be advantageous in different situations. For example, the embodiment in FIGS. 7.5 and 7.5a provides an advantage of being able to reach areas in the soil 3 that are more difficult to saturate. Any of the above exemplary embodiments may be used independently, or two or more of the embodiments may be combined and used together and/or concurrently. For example, the exemplary embodiment illustrated in FIG. 7.5 may be combined with exemplary embodiment illustrated in FIG. 7.1a such that water is provided to the soaker tubes 9 via an inlet 10 instead of funnels 14. As yet another example, FIGS. 7.6, 7.6a and 7.6b illustrate a variation of FIG. 7.5, such that a matrix of water collecting devices (e.g., funnels 14, rain catching device 17, or some variation and or combination thereof) are provided on the side of the growing pillar. FIG. 7.6a is a zoomed-in view of FIG. 7.6, and FIG. 7.6b is a top-down view of FIG. 7.6.

Figure 8:
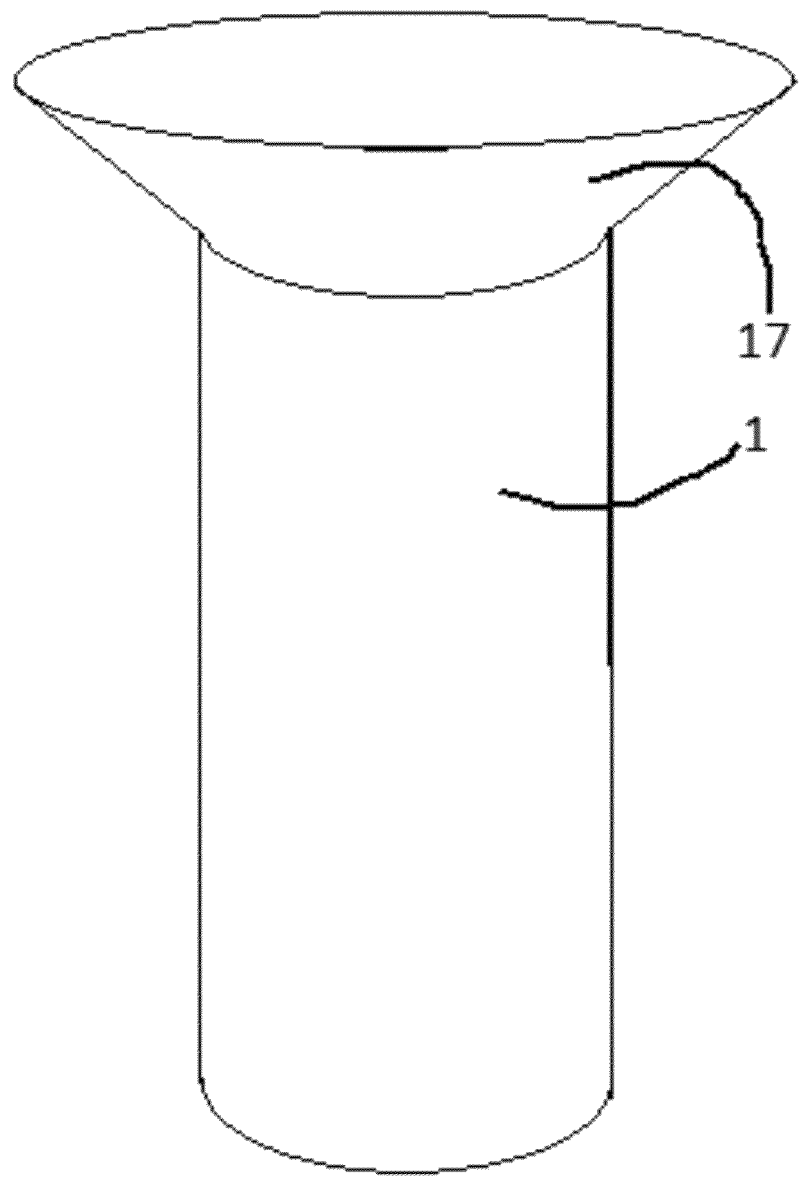
FIG. 8 is a view of a growing pillar with a rain catching device, according to an exemplary embodiment.

FIG. 8 is a view of a growing pillar with a rain catching device, according to an exemplary embodiment.

The water that is absorbed into the soil 3 through an irrigation system, or some other means, may be captured yet again at the bottom of the growing pillar.

FIGS. 8.1a-8.1b illustrate exemplary embodiments of a growing pillar with a water filtration system.

FIG. 8.1a shows an exemplary embodiment where the bottom of the growing pillar is provided with a layer of the fabric 2. Water flowing downward through the soil 3 is forced through the fabric 2 as a first filtration and is directed through opening 29 to a containment area. The containment area is preferably large enough to hold water that is directed from multiple growing pillars. The water collected in the containment area may then be recycled by being purified further for drinking or other purposes, or redirected back to the growing pillars, or otherwise be used for some purpose.

FIG. 8.1a shows an exemplary embodiment where water flowing downward through the soil 3 is forced through different materials to filter the water. For example, gravel 27, sand 28, fabric 2, or any other suitable filtering material or any combination thereof. The water may again be directed through opening 29 to a containment area as described above with respect to FIG. 8.1a.

Figure 9A:
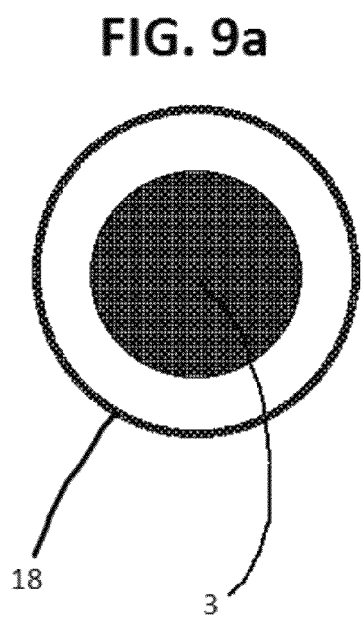
FIGS. 9-9a are views of a growing pillar with a greenhouse attachment, according to an exemplary embodiment.
Figure 9:
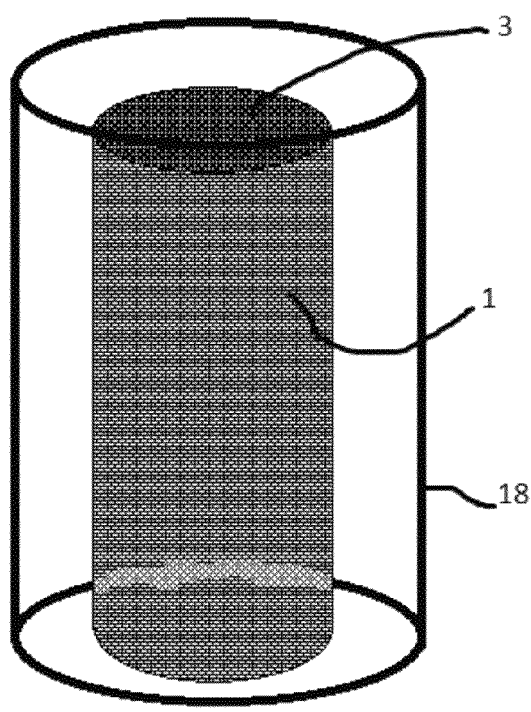

FIGS. 9 and 9a illustrate exemplary embodiments of the growing pillar with a greenhouse attachment. Each growing pillar may be placed inside its own greenhouse 18, or grouped with other growing pillars and placed inside a larger greenhouse. The growing pillars are placed in the greenhouse 18 to obtain the advantages that greenhouses provide for growing plants. Additionally, the structure of the pillars maximizes the use of space within the greenhouse.

Figure 10:
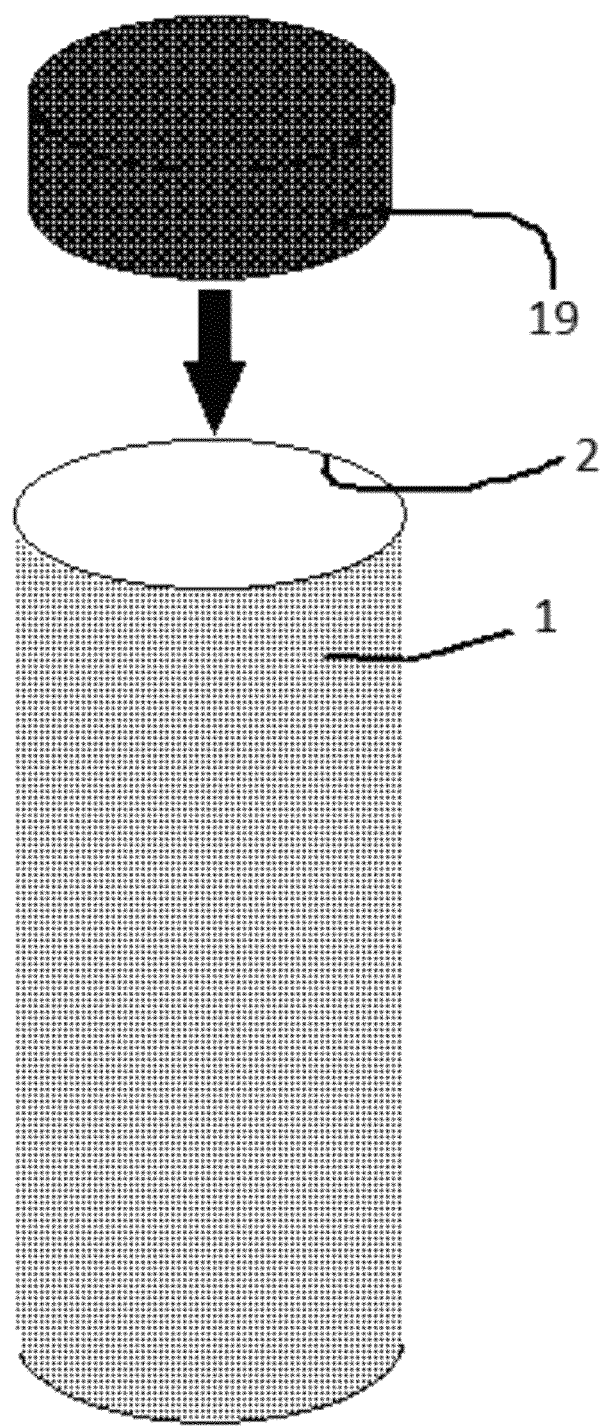
FIG. 10 is a process view showing a growing pillar being refilled, according to an exemplary embodiment.

FIG. 10 illustrates an exemplary embodiment of a method of refilling and or fertilizing the soil in a growing pillar. Over time, the soil 3 will become compacted or settle, reducing the available soil that can be used for planting. To avoid this, the upper portion of the growing pillar may be refilled with fresh material, such as compost, soil, or other material. By refilling the growing pillar from the top, the nutrients provided in the new material will percolate through the soil.

Figure 11:
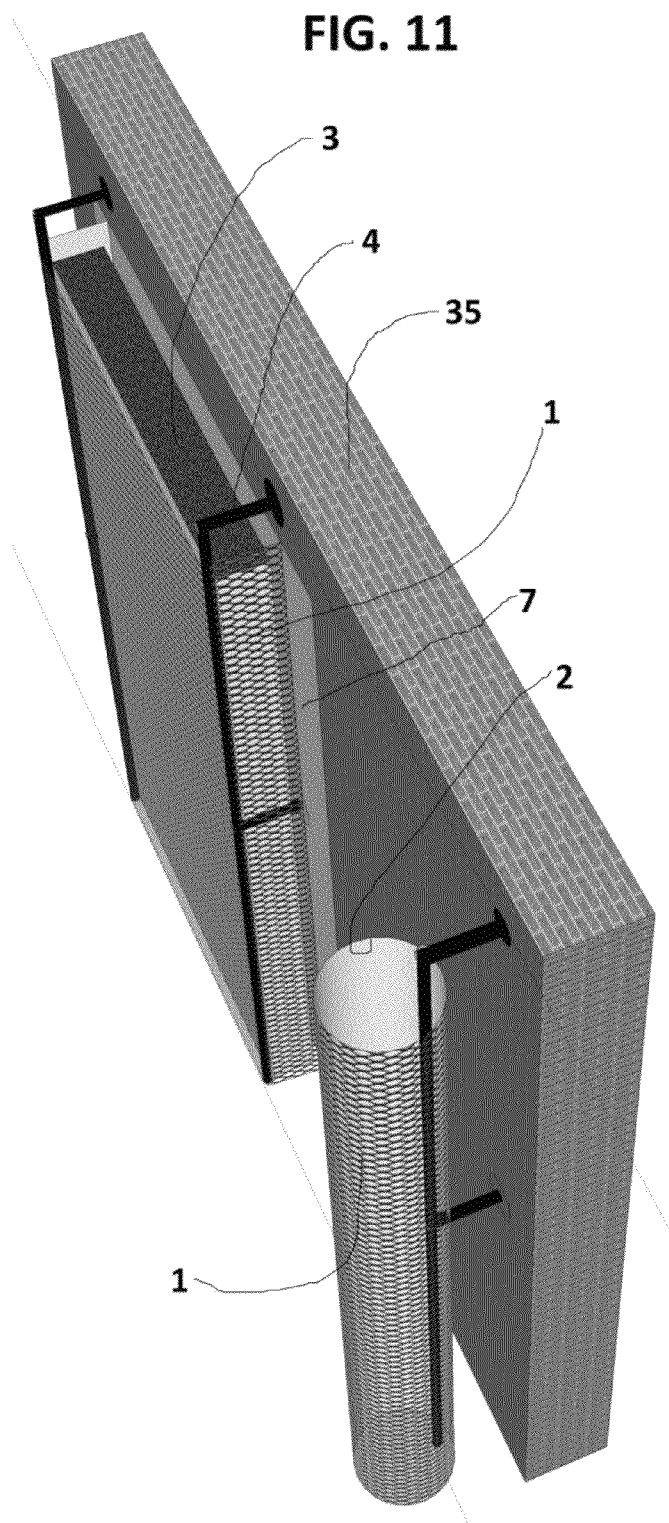
FIG. 11 is a view of a growing pillar affixed to an existing support medium, according to an exemplary embodiment.

Thus far the exemplary embodiments of the growing pillar have been free standing pillar structures. FIG. 11 illustrates alternative exemplary embodiments where the growing pillar may be formed in a cylindrical shape but affixed to an existing support medium such as the wall of a building. FIG. 11 also illustrates the growing pillar in the shape of a rectangular prism, which also may be affixed to an existing support medium. FIGS. 27-27.1 illustrate growing pillars affixed to an existing support medium 35 where a water repellant material 7 is provided as a barrier between the growing pillar and the support medium 35 to reduce damage to the support medium 35 from water, microorganisms, and the like.

Figure 12:
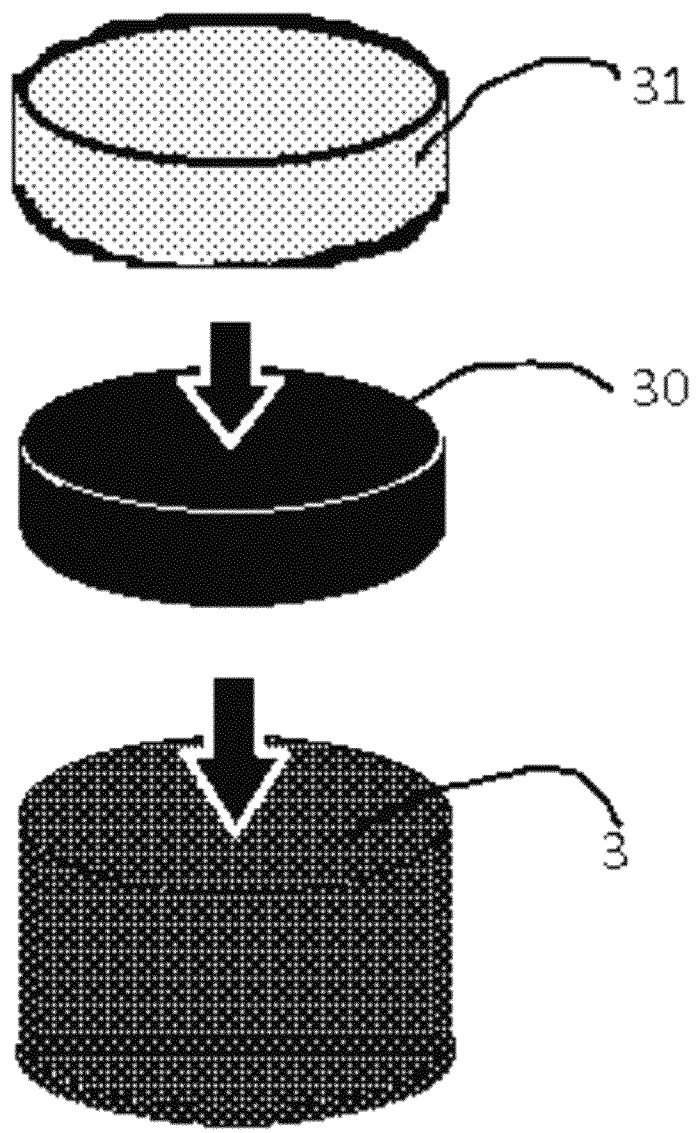
FIG. 12 is a view of refill material including a layer of worm food and a layer of worms, according to an exemplary embodiment.
Figure 13:
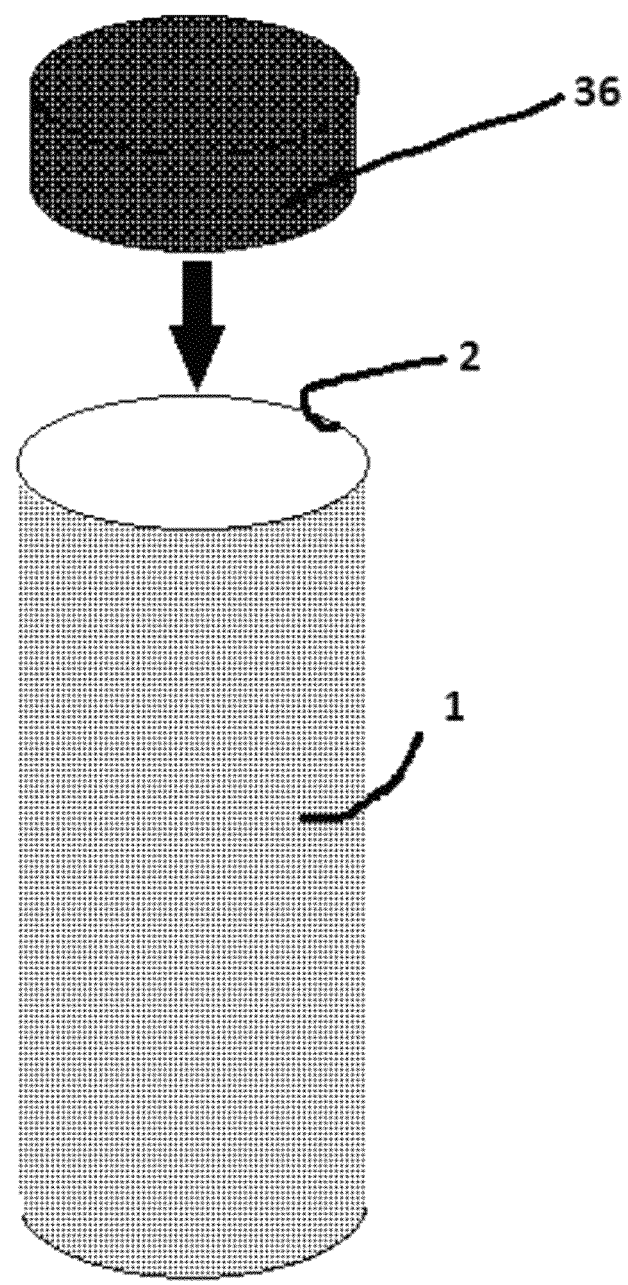
FIG. 13 is a view of refill material including compost material, according to an exemplary embodiment.
Figure 15:
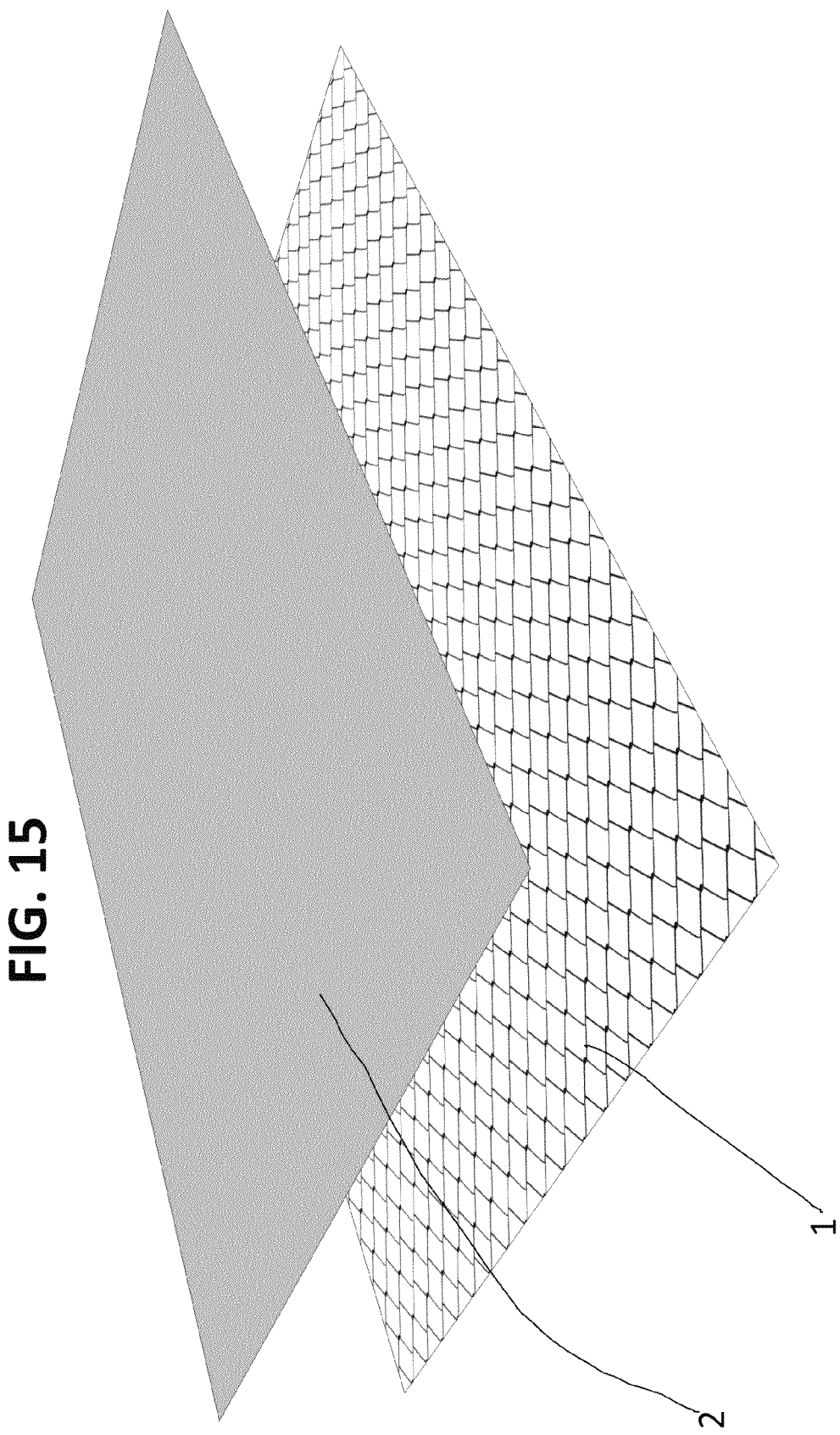

FIG. 12 illustrates an exemplary embodiment of growing material that can be used to fill or refill the growing pillar. Specifically, FIG. 15 shows that vermin-composting can be done in the growing pillar by including layers of worm food 31 and a layer of worms 30. The layer of worms can be substituted with a layer of other helpful organisms or multiple layers of different organisms or a layer including a mixture of helpful organisms, and the layer of worm food 31 may be replaced with a layer of food for what ever organisms are provided in layer 30. Also, alternating layers of organisms and food may be used. As the worms eat their food supply they create finished compost that can be planted in and grown from. When the worms multiply they can be used to start more vermin-composting growing pillars.

Using standard aerobic composting methods, the pillar will hold the heap together and protects from vermin and animal entry. Typical aerobic heap turning is necessary, and when the compost is finished it can immediately be planted in.

Figure 14:
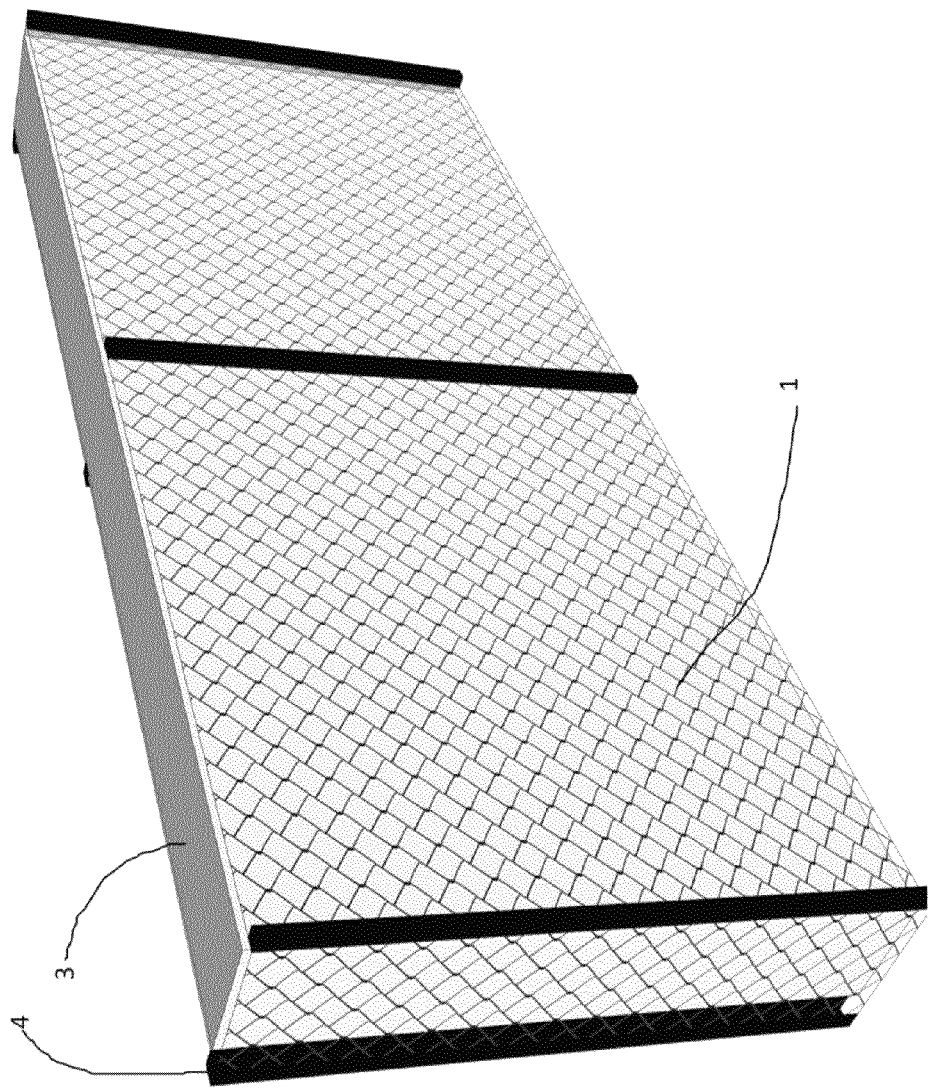
FIG. 14 is a view of a growing pillar in the shape of a rectangular prism, according to an exemplary embodiment.

FIG. 14 illustrates an exemplary embodiment of a growing pillar in the shape of a rectangular prism, forming a free standing wall structure.

Figure 16A:
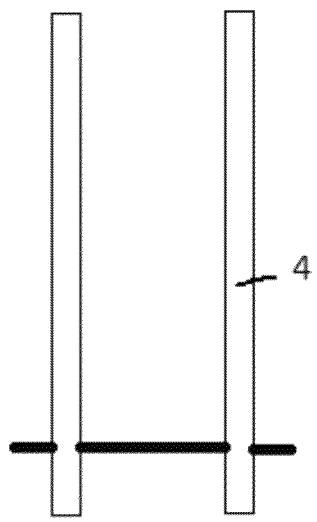
Figure 16B:
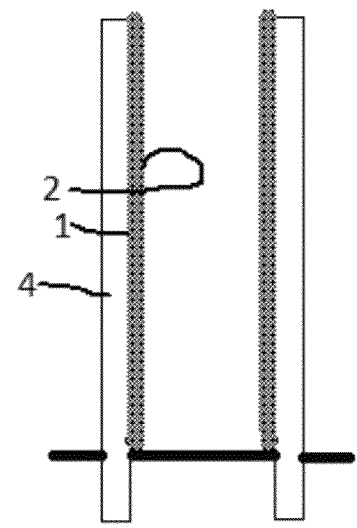
Figure 17A:
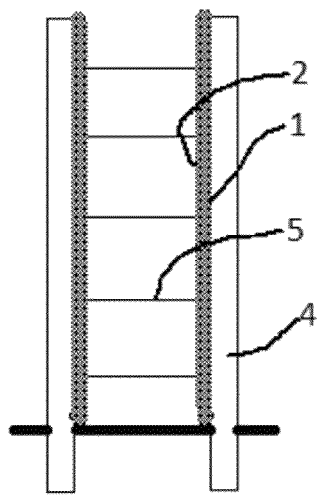
Figure 17B:
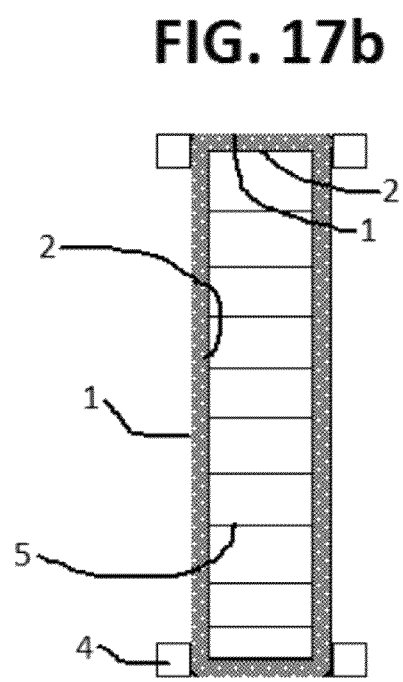
Figure 18:
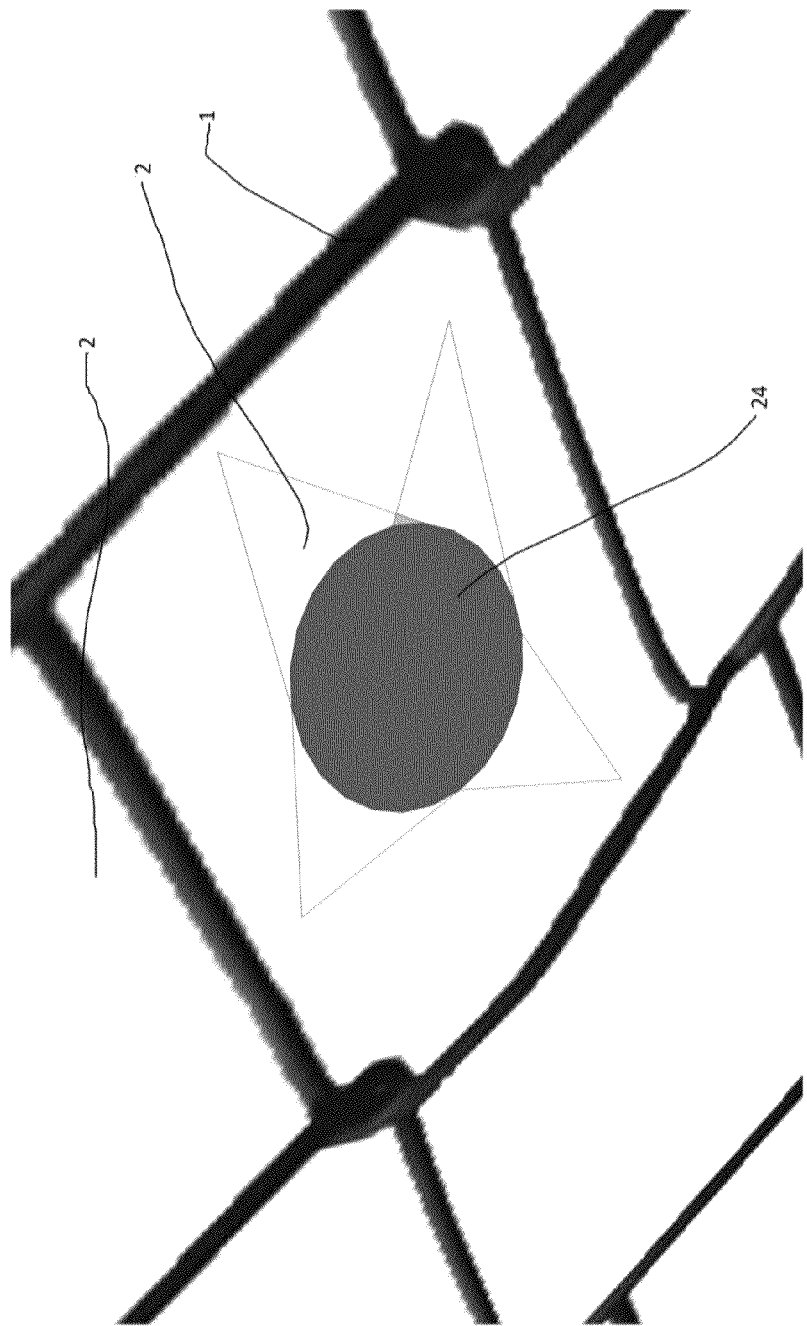

FIGS. 15-22 illustrate exemplary embodiments of a method of creating the growing pillar shown in FIG. 14. The fabric 2 is attached to fencing 1 as shown in FIG. 15. Support posts 4 are placed in the ground at the corners of the desired location of the growing pillar, and optionally along the perimeter of the desired location of the growing pillar for added support, as shown in FIG. 16a. The support posts 4 may be secured in the ground with additional structural support 21, such as cement, if necessary, as shown in FIGS. 16.1a and 16.1b. The fence-fabric combination is placed on the support posts 4 as shown in FIG. 16b, by attaching the fence-fabric combination to the support posts 4. Tension cords 5 may be used between the two sides of the wall to prevent budging, as shown in FIG. 17a. FIG. 17b is a top-down view of FIG. 17a. The enclosed area created inside the growing pillar is filled with compost or some other suitable growing medium, as shown in FIGS. 17.1a and 17.1b.

Planting and growing plants using the wall shaped growing pillar follow the same principles as described above with respect to FIGS. 5.1 and 5.2. Likewise, a water capture system, irrigation system, or other features described above may be implemented in any combination in this exemplary embodiment by following the relevant provided principles. Exemplary embodiments of the growing pillar are described below to show how one might apply the aforementioned principles to adapt the systems and features described above for the wall shaped growing pillar, and implement them.

FIGS. 19, 19a, and 19b illustrate an alternative exemplary embodiment of a growing pillar with a water capture system, where filler material 6 is used to make a slight gradient with respect to the ground, with the low point, or low points(s) as shown in FIGS. 19.1 and 19.1a, being water collection point (s). A sheet of plastic or other water repellant material 7 is used to cover this sloped filler material 7 to retain the water until the water collects at the low point(s), where it exits through water tube 8. The water tube 8.

Figure 20A:
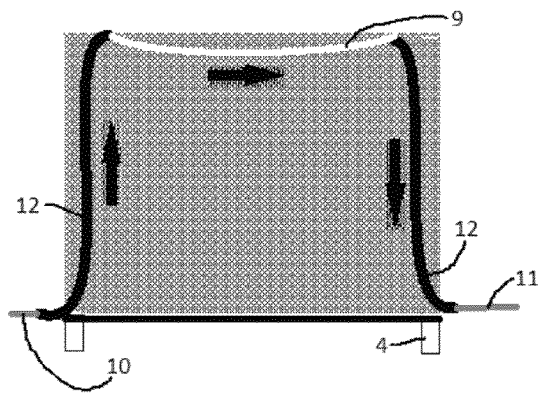

FIG. 20a shows a growing pillar with an irrigation system where water enters the growing pillar through inlet 10, travels through a water pipe (not shown) that is encased in the protective tube 12. As the water travels the length of the growing pillar, it passes through the soaking tube 9 from which it may be absorbed into the soil.

Figure 20B:
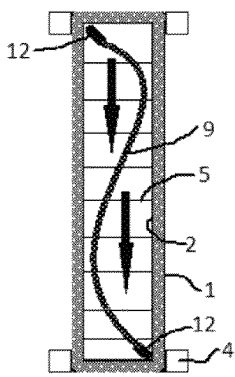
Figure 20C:
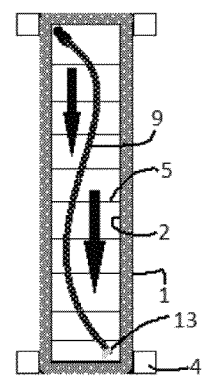

FIGS. 20b is a top-down view of FIG. 20a showing the soaking tube 9 following a zigzag-like pattern along the top of the growing pillar. The end of the soaking tube 9 may be terminated with cap 13, as shown in FIG. 20c. The water may be directed along other patterns or non-pattern shapes as it travels either in the vertical or horizontal direction.

FIG. 21.1a is a top-down view and FIG. 21.1b is a side view of an alternative exemplary embodiment of a growing pillar with an irrigation system using funnels 14. FIGS. 21.2a and 21.2b illustrate another alternative exemplary embodiment of a growing pillar with an irrigation system. FIGS. 21.3a and 21.3b illustrate another alternative exemplary embodiment of a growing pillar with an irrigation system, using a water container 15 that covers a portion of the top of the growing pillar. FIGS. 21.4a and 21.4b illustrate another alternative exemplary embodiment of a growing pillar with an irrigation system using a water container 15 that covers all of the top of the growing pillar. The water container 15 may include holes 16 to slowly release collected water into the soil, or may the water container's base may be completely open as shown with the rain catching device 17 in FIG. 21.6. The rain catching device 17 may also have holes 16 or have a base that is completely open. FIG. 21.5 illustrates another alternative exemplary embodiment of a growing pillar with an irrigation system.

FIGS. 22 and 22a illustrate an exemplary embodiment of a growing pillar formed in a wall shape with a greenhouse attachment. Each growing pillar may be placed inside its own greenhouse 18, or grouped with other growing pillars and placed inside a larger greenhouse. The growing pillars are placed in the greenhouse 18 to obtain the advantages that greenhouses provide for growing plants. Additionally, the structure of the pillars maximizes the use of space within the greenhouse.

FIG. 23 illustrates an exemplary embodiment of a growing pillar formed in a wall shape having one side of the fencing 1 raised higher than the other sides. The raised portion of the fencing 1 is not covered by the fabric 2, and provides for added growing surface area for vines and climbing plants. Alternatively, more than one side, or all sides of the fencing 1 may be raised such that these portions are not covered by the fabric 2.

FIG. 24 illustrates an exemplary embodiment of a method of refilling and or fertilizing the soil in a growing pillar. After settling and compaction of the growing medium 3, the enclosed area is filled with fresh compost and/or compost tea to achieve trickle down fertilizing. Other suitable fertilizing methods can also be used.

Figure 25:
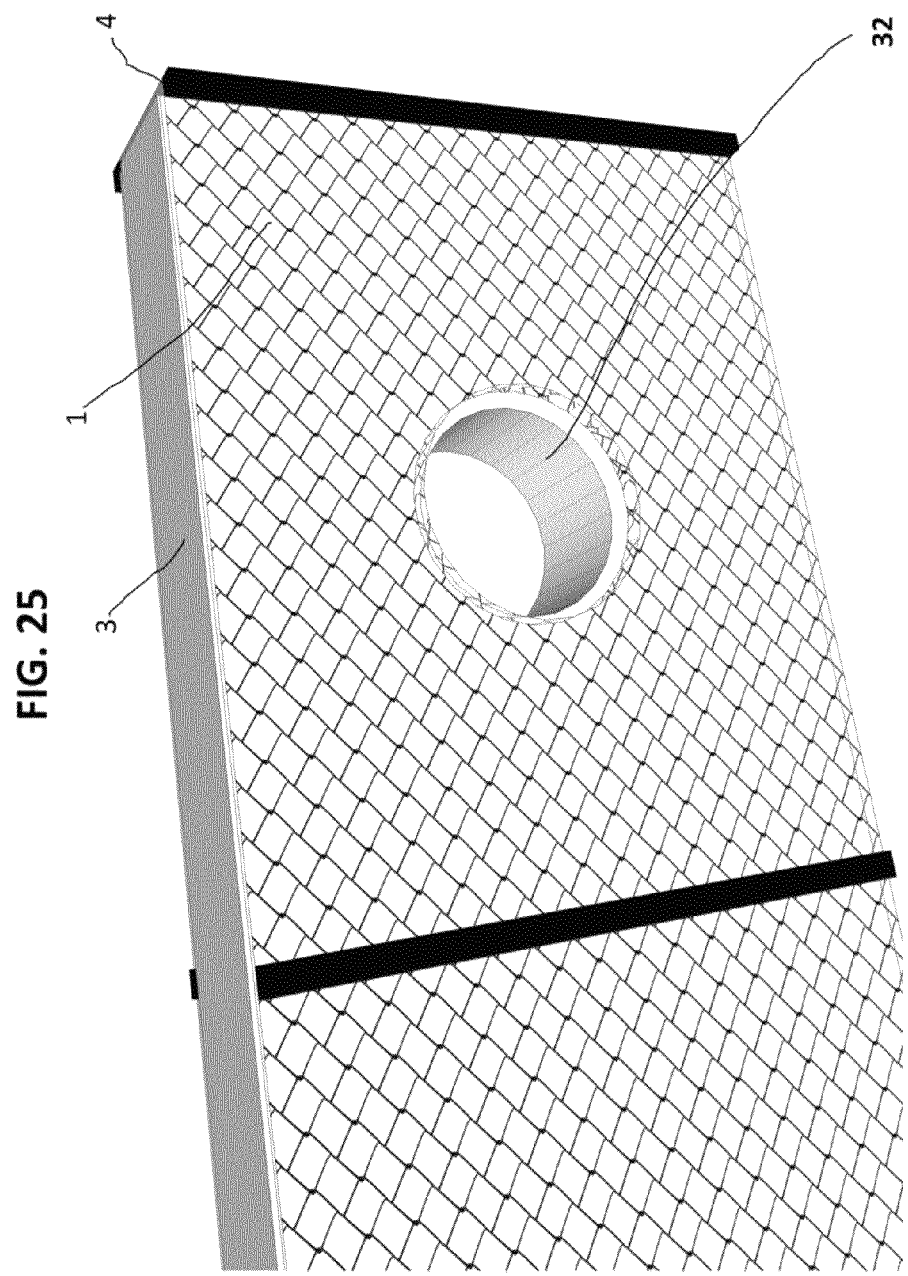
FIG. 25 is a view of a growing pillar with a wind passage hole, according to an exemplary embodiment.

Growing pillars formed in a wall or other shape of sufficient size may face pressure from high winds. To relieve the stress of heavy winds, FIG. 25 shows a wind passage hole 32 to alleviate the wind pressure. One or more wind passage holes 32 may be formed in the growing pillar. The wind passage hole may be formed using a hollow cylindrical tube, or any other shape, with an opening size based on the quantity and force of the wind and the size and shape of the growing pillar itself. The wind passage hole 32 runs the entire width of the structure, allowing wind to go through. The wind passage holes 32 can be exposed, or be hidden by fabric 2, as shown in FIG. 25.1.

Figure 26A:
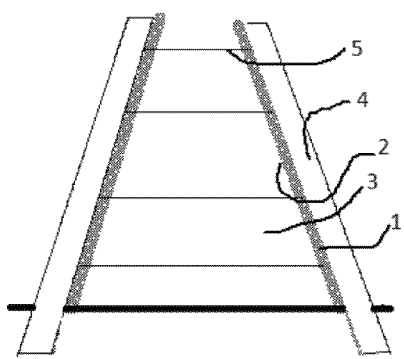
FIGS. 26a-26b are views of a growing pillar with angled sides, according to an exemplary embodiment.
Figure 26B:
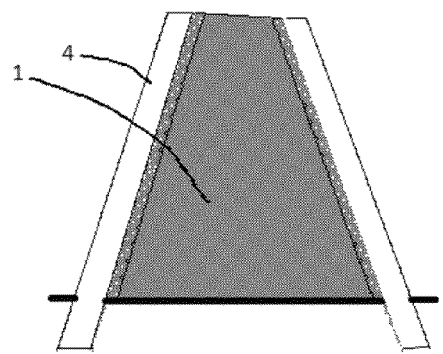

FIGS. 26a and 26b illustrate an exemplary embodiment of a growing pillar formed in a wall shape but with angled sides. The angled sides increase the surface area exposed to falling rain. Preferably, it is built quite similar to the standard wall shaped growing pillar, but with an angle making the bottom of the wall wider than the top for greater stability. FIGS. 26.1a and 26.1b illustrate an alternative exemplary embodiment of the growing pillar shown in FIGS. 26a and 26b, where the angled sides include water catching tabs 20 protruding outward at an angle. The crevice formed between the water catching tabs 20 and the angled side server as additional water collection points. The water catching tabs 20 may also be added to growing pillars without angled sides.

Although the preferred embodiments of the present invention have been disclosed for illustrative purposes, those skilled in the art will appreciate that various modifications, additions, and substitutions are possible, without departing from the scope and spirit of the invention as disclosed in the accompanying claims. For example, the various alternative exemplary embodiments may be combined to create an embodiment of the growing pillar with both a water irrigation system and a water filtration system; or specific features of the exemplary embodiments described above may be combined where appropriate to create a multitude of variations; or a group of pillars of different shapes may be used in combination and/or be interconnected with each other.

The invention claimed is:

1. A structure to grow plants, the structure comprising:
   a fence;
   a fabric attached to the fence to form a fence-fabric combination, wherein the fence-fabric combination is in the shape of a vertical pillar with an enclosed area;
   a support post which extends the length of the vertical pillar at the center thereof;
   a growing material filled in the enclosed area;
   an irrigation system comprising a plurality of water tubes attached to the support post, wherein each of the plurality of water tubes is connected to a funnel at the top of the vertical pillar above the growing material, wherein each of the plurality of water tubes extend downward into the growing material along the support post to a desired depth near a middle of the vertical pillar, wherein each of the plurality of water tubes is attached to a porous soaker tube which extends radially outward from the center of the vertical pillar at the desired depth, wherein each of the porous soaker tubes is capped with a cap; and
   a water capture system comprising a filler material different from the growing material, wherein the filler material is disposed at the bottom of the vertical pillar under the growing material to form a downward angle toward an outlet, and wherein the growing material is separated from the filler material by a water repellant sheet such that excess water that seeps through the growing material is diverted along the water repellant sheet toward the outlet and out of the bottom of the pillar via the outlet.

2. The structure of claim 1, further comprising holes formed in the fence-fabric material of the fence-fabric combination.

3. The structure of claim 1, further comprising a water filtration system that filters water.

4. The structure of claim 1, further comprising a greenhouse attachment.

5. The structure of claim 1, wherein the vertical pillar is affixed to an existing structure.

6. A method for creating a structure to grow plants, the method comprising:
   providing a fencing material and a fabric;
   attaching the fabric to the fencing material to form a fence-fabric combination;
   shaping the fence-fabric combination into a vertical pillar with an enclosed area;
   providing a support post which extends the length of the vertical pillar at the center thereof;
   filling the enclosed area with a growing material;
   providing an irrigation system comprising:
   attaching a plurality of water tubes to the support post,
   connecting each of the plurality of water tubes to a funnel at the top of the vertical pillar above the growing material, wherein each of the plurality of water tubes extend downward into the growing material along the support post to a desired depth near a middle of the vertical pillar,
   attaching each of the plurality of water tubes to a porous soaker tube which extends radially outward from the center of the vertical pillar at the desired depth,
   capping each of the porous soaker tubes with a cap; and
   providing a water capture system comprising:

disposing a filler material different from the growing material at the bottom of the vertical pillar under the growing material to form a downward angle toward an outlet, and separating the growing material from the filler material by providing a water repellant sheet therebetween such that excess water that seeps through the growing material is diverted along the water repellant sheet toward the outlet and out of the bottom of the pillar via the outlet.

7. The method of claim 6, further comprising: cutting holes in the fence-fabric material to plant plants.

8. The method of claim 6, further comprising: attaching a water filtration system to filter water.

9. The method of claim 6, further comprising: enclosing the structure in a greenhouse.

10. The method of claim 6, further comprising: affixing the structure to an existing structure.

* * * * *